United States Patent
Kim et al.

(10) Patent No.: US 10,133,310 B2
(45) Date of Patent: Nov. 20, 2018

(54) MOBILE TERMINAL AND METHOD FOR CONTROLLING THE SAME

(71) Applicant: LG ELECTRONICS INC., Seoul (KR)

(72) Inventors: Samsick Kim, Seoul (KR); Donghwan Yu, Seoul (KR); Seojin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 272 days.

(21) Appl. No.: 14/657,117

(22) Filed: Mar. 13, 2015

(65) Prior Publication Data
US 2016/0132074 A1 May 12, 2016

(30) Foreign Application Priority Data
Nov. 10, 2014 (KR) .................. 10-2014-0155712

(51) Int. Cl.
*G06F 1/16* (2006.01)
*G06F 3/0481* (2013.01)
(Continued)

(52) U.S. Cl.
CPC .......... *G06F 1/1652* (2013.01); *G06F 1/1643* (2013.01); *G06F 1/1681* (2013.01);
(Continued)

(58) Field of Classification Search
CPC ............... G06F 1/1652; G06F 3/04883; G06F 3/04817; G06F 3/0482
See application file for complete search history.

(56) References Cited

U.S. PATENT DOCUMENTS

2006/0236505 A1* 10/2006 Maatta .................. H04M 1/022
16/366
2010/0064244 A1 3/2010 Kilpatrick et al.
(Continued)

FOREIGN PATENT DOCUMENTS

KR 10-2010-0092222 8/2010

OTHER PUBLICATIONS

Domanico, "A Guide to the Android Notification Drawer", published: Nov. 20, 2013, tomsguide.com, http://www.tomsguide.com/us/android-notification-drawer-basics,news-21301.html.*
(Continued)

*Primary Examiner* — Andrey Belousov
*Assistant Examiner* — Seth A Silverman
(74) *Attorney, Agent, or Firm* — Lee, Hong, Degerman, Kang & Waimey PC

(57) ABSTRACT

Disclosed is a mobile terminal using a display unit and a control method thereof. The mobile terminal includes a controller which displays first screen information corresponding to a first application on a first display region disposed on an inner surface when the mobile terminal is open, and converts the first screen information into second screen information when a folding event is generated. Further, the controller converts the first screen information or the second screen information into third screen information which is different from the second screen information when an angle between first and second regions of the first display region corresponding to the folding event is less than a reference value.

20 Claims, 30 Drawing Sheets

(51) Int. Cl.
*G06F 3/0482* (2013.01)
*G06F 3/0488* (2013.01)
*G06F 3/147* (2006.01)
*G09G 5/14* (2006.01)

(52) U.S. Cl.
CPC ........ *G06F 3/0482* (2013.01); *G06F 3/04817* (2013.01); *G06F 3/04883* (2013.01); *G06F 3/147* (2013.01); *G06F 2203/04803* (2013.01); *G09G 5/14* (2013.01); *G09G 2340/04* (2013.01); *G09G 2340/0464* (2013.01); *G09G 2340/14* (2013.01); *G09G 2354/00* (2013.01); *G09G 2358/00* (2013.01); *G09G 2380/02* (2013.01); *G09G 2380/14* (2013.01)

(56) References Cited

U.S. PATENT DOCUMENTS

| | | | |
|---|---|---|---|
| 2010/0182265 | A1 | 7/2010 | Kim et al. |
| 2011/0258582 | A1* | 10/2011 | Bang ................... G06F 3/04817 715/811 |
| 2012/0304107 | A1 | 11/2012 | Nan et al. |
| 2013/0117698 | A1* | 5/2013 | Park ................... G06F 3/04817 715/765 |
| 2013/0321340 | A1* | 12/2013 | Seo ....................... G06F 1/1641 345/174 |
| 2014/0015743 | A1* | 1/2014 | Seo ....................... G06F 1/1694 345/156 |
| 2014/0347264 | A1* | 11/2014 | Lee ..................... G06F 15/0291 345/156 |

OTHER PUBLICATIONS

Hildenbrand, "Android 101: Manage your battery life by setting your screen timeout and brightness", published: Sep. 12, 2011, androidcentral.com, http://www.androidcentral.com/android-101-manage-your-battery-life-setting-your-screen-timeout-and-brightness.*

Domanico, "A Guide to the Android Notification Drawer", published: Nov. 20, 2013, tomsguide.com, http://www.tomsguide.com/us/android-notification-drawer-basics,news-21301.html (Year: 2013).*

Hildenbrand, "Android 101: Manage your battery life by setting your screen timeout and brightness", published: Sep. 12, 2011, androidcentral.com, http://www.androidcentral.com/android-101-manage-your-battery-life-setting-your-screen-timeout-and-brightness (Year: 2011)*

PCT International Application No. PCT/KR2015/002481, Written Opinion of the International Searching Authority dated Jul. 22, 2015, 17 pages.

* cited by examiner 251c   251c"   251b 251a   251ab   251b

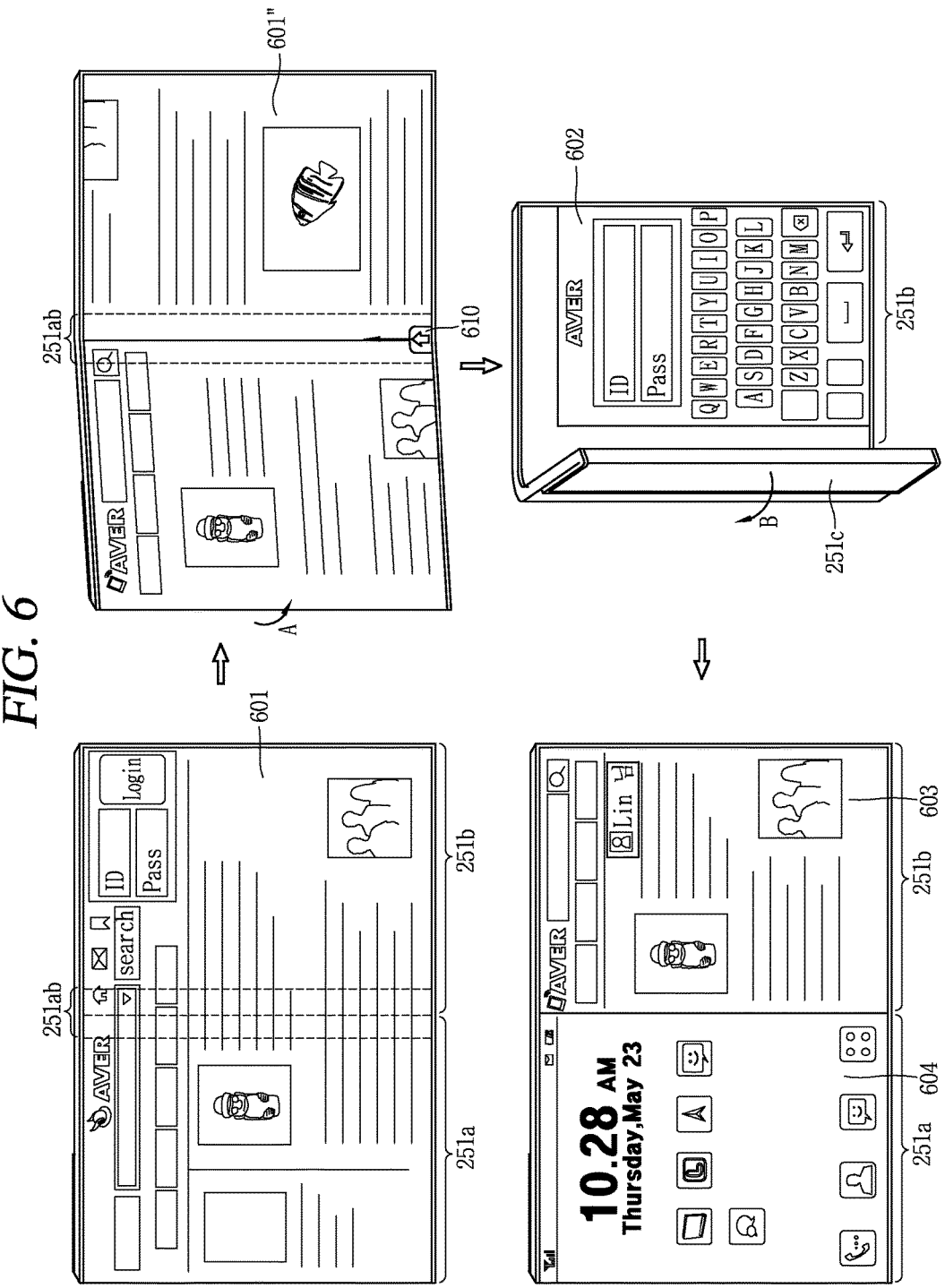

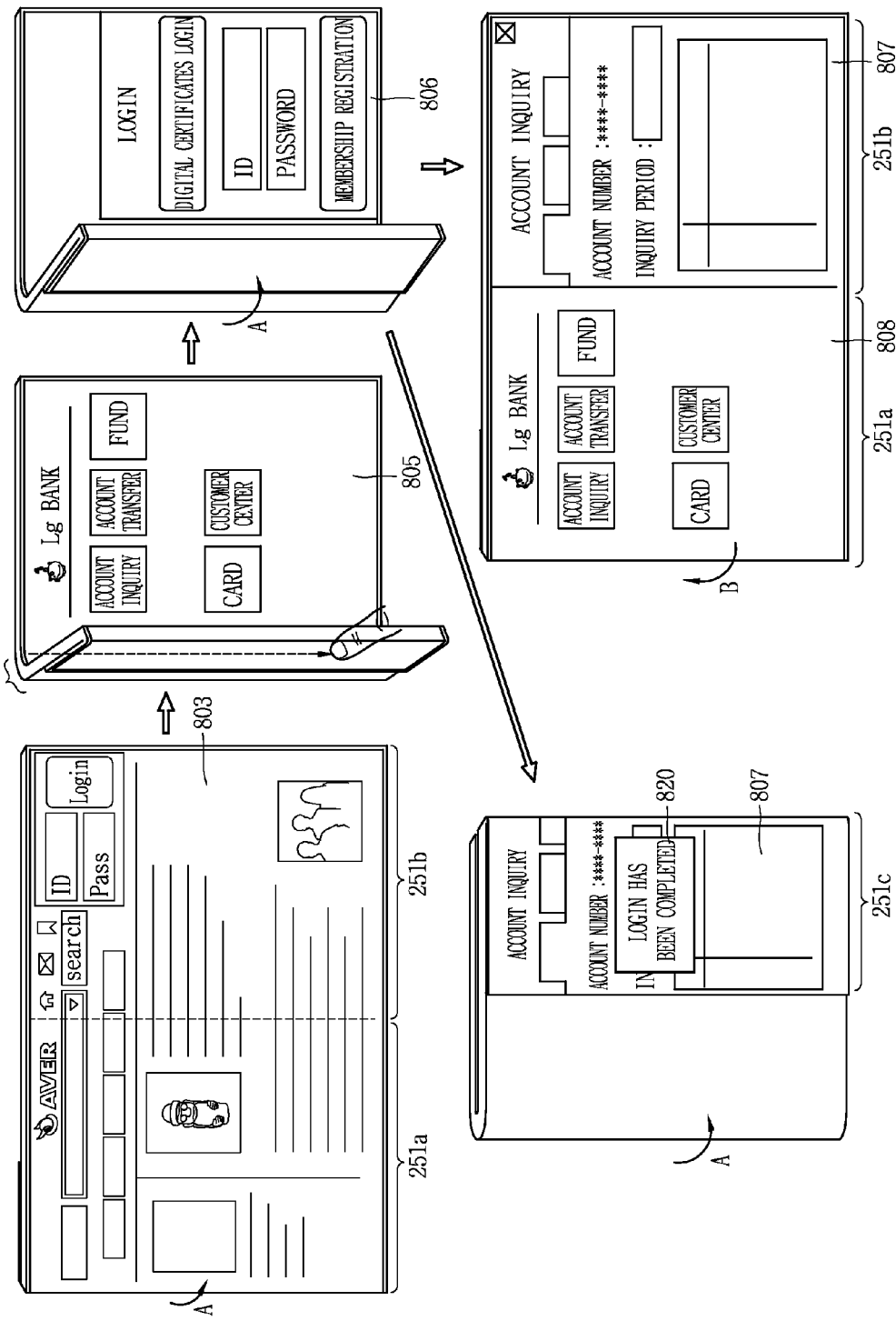

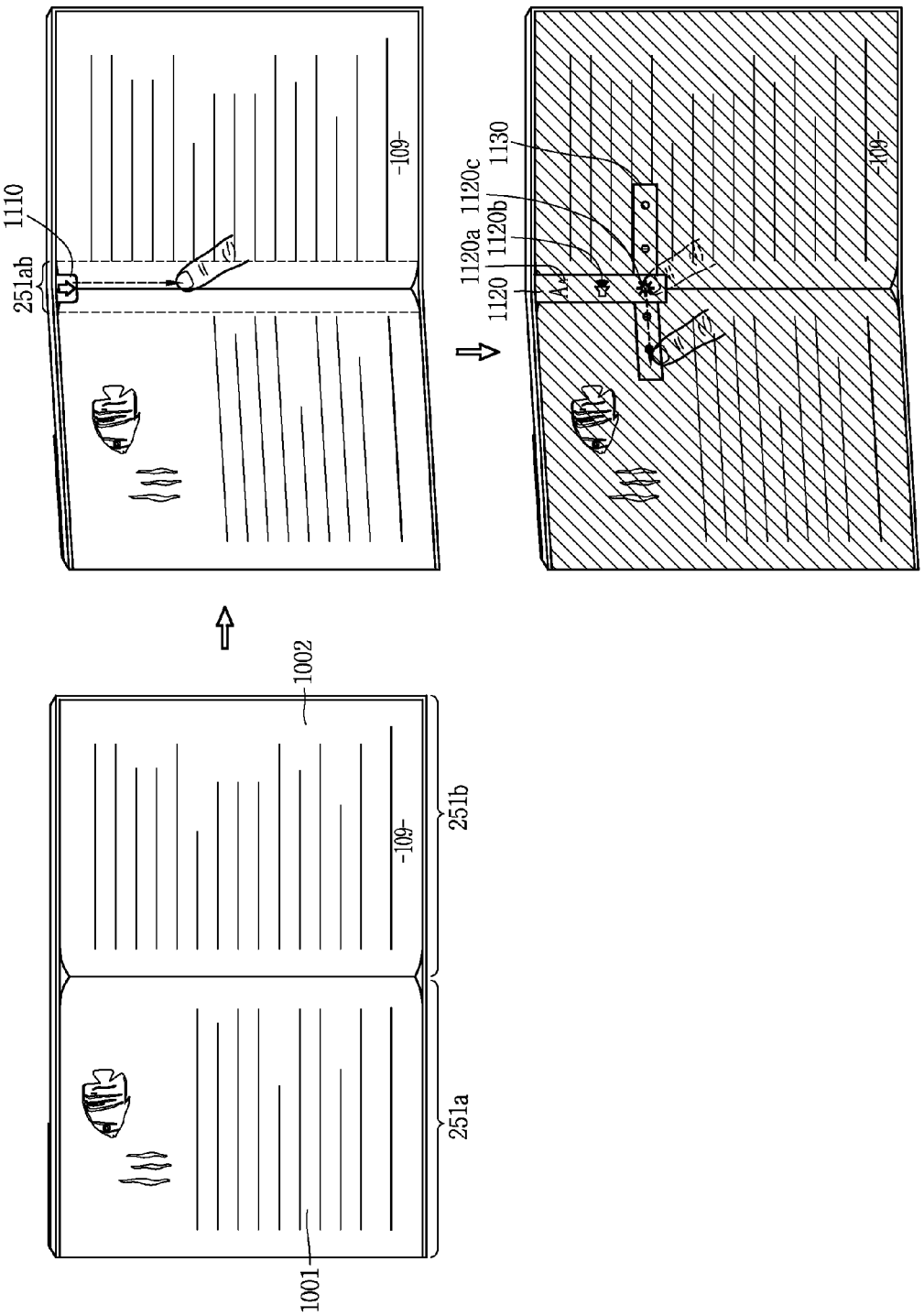

MOBILE TERMINAL AND METHOD FOR CONTROLLING THE SAME

CROSS-REFERENCE TO RELATED APPLICATIONS

Pursuant to 35 U.S.C. § 119(a), this application claims the benefit of earlier filing date and right of priority to Korean Application No. 10-2014-0155712, filed on Nov. 10, 2014, the content of which is incorporated by reference herein in its entirety.

BACKGROUND OF THE INVENTION

1. Field of the Invention

The present invention relates to a mobile terminal using a display unit, and a method for controlling the same.

2. Description of the Conventional Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions may include data and voice communications, capturing images and video through a camera, recording audio, playing music files through a speaker system, and displaying images and video on a display unit. Some mobile terminals additionally provide functions such as playing an electronic game, or executing a function of multimedia players. Especially, recent mobile terminals may receive multicast signal for providing visual content such as broadcasts, videos, or television programs.

As it becomes multifunctional, a mobile terminal can be allowed to capture still images or moving images, play music or video files, play games, receive broadcast and the like, so as to be implemented as an integrated multimedia player.

Efforts are ongoing to support and increase the functionality of mobile terminals. Such efforts include software and hardware improvements, as well as changes and improvements in the structural components.

As one of such structural changes and improvements in the mobile terminal, a display unit, which has a structure that an inner display is extended to an external surface of the mobile terminal, may be provided, and a new user interface environment for controlling a large-sized screen by folding or unfolding such a display unit may be considered.

SUMMARY OF THE INVENTION

It is an object of the present invention to provide a mobile terminal and a method for controlling the same, which is capable of controlling a screen output to a display unit using a folding or unfolding operation of an inner display.

It is another object of the present invention to provide a mobile terminal and a method for controlling the same, which is capable of providing different information according to a folded or unfolded degree of an inner display.

It is still another object of the present invention to provide a mobile terminal and a method for controlling the same, which is capable of inputting various types of control commands using a folding or unfolding operation of an inner display and a touch input applied to a specific region of the inner display.

To achieve these and other advantages and objects of the present invention, there is provided a mobile terminal including: a terminal body comprising an inner side and an outer side and configured to be converted between an open configuration and a folded configuration; a display comprising an inner display region disposed on the inner side and configured to be bent about a specific region; and a controller configured to: cause the display to display first screen information corresponding to a first application on the inner display region when the terminal body is in the open configuration; cause the display to display second screen information related to the first screen information in response to a bending event of the terminal body about the specific region; and terminate the displaying of the first screen information or the second screen information and cause the display to display third screen information when an angle of the bending event is less than a threshold value.

In an embodiment of the present invention, the specific region may be disposed between the first region and the second region, and an angle between the first region and the second region may be determined by a degree that the first region and the second region are relative-rotated based on the specific region.

In an embodiment of the present invention, the specific region defines a division between a first region and a second region of the inner display region; and the angle of the bending event corresponds to a rotational degree between a surface corresponding to the first region and surface corresponding to the second region.

In an embodiment of the present invention, the first screen information corresponds to an execution screen displayed on an entire part of the inner display region; and the second screen information comprises a plurality of execution screens displayed on the first region and the second region.

In an embodiment of the present invention, the third screen information comprises an execution screen displayed on a third region of the inner display region.

In an embodiment of the present invention, the third screen information comprises an input area for inputting security-related information, and the controller is further configured to: terminate the displaying of the third screen information and cause the display to display second screen information updated with the security-related information when the terminal body is moved to the open configuration; and cause the display to display an indicator on an outer display region of the display that the security-related information has been applied to the second screen information.

In an embodiment of the present invention, the controller is further configured to cause the display to display the third screen information when: the angle of the bending event is maintained for a threshold length of time; or a touch input applied to the first display region is maintained for another threshold length of time.

In an embodiment of the present invention, the controller is further configured to cause the display to display a first image object on the specific region in response to the bending event, the first image object related to display settings.

In an embodiment of the present invention, the controller is further configured to cause the display to: cease displaying the first image object after a threshold length of time; and re-display the first image object in response to a touch input to the specific region while the angle of the bending event is maintained.

In an embodiment of the present invention, the controller is further configured to cause the display to display a second image object on the specific region related to at least a second application in response to a touch input to the specific region.

In an embodiment of the present invention, the controller is further configured to: cause the display to display a plurality of application icons in response to a touch drag input to the displayed second image object, the plurality of application icons displayed along a path of the touch drag input on the specific region; and execute an application corresponding to a selected one of the plurality of application icons; terminate the displaying of the first screen information or the second screen information and cause the display to display an execution screen of the executed application.

In an embodiment of the present invention, the controller is further configured to: cause the display to display a plurality of settings icons in response to a touch drag input to the specific region, the plurality of settings icons displayed along a path of the touch drag input; and apply a setting in response to a touch input to one of the plurality of settings icons; wherein the setting is changed based on a bending angle between a surface corresponding to the first region and a surface corresponding to the second region.

In an embodiment of the present invention, the specific region defines a division between a first region and a second region of the inner display region; and the controller is further configured to: cause the display to display a plurality of application icons in response to a first touch drag input to the specific region, the plurality of application icons displayed along a path of the first touch drag input; and move a selected one of the plurality of application icons to the first region or the second region in response to a second touch drag input moving the selected one of the plurality of applications to the corresponding first region or second region.

In an embodiment of the present invention, the controller is further configured to: cause the display to display a first plurality of icons on the specific region in response to a touch input to the specific region; and terminate the displaying of the first plurality of icons and cause the display to display a second plurality of icons in response to the terminal body being bent about the specific region at a predetermined angle.

In an embodiment of the present invention, the specific region defines a division between a first region and a second region of the inner display region; the display further comprises an outer display region disposed on the outer side, the outer display region continuous with the inner display region; and the controller is further configured to cause the display to display: a notification of an event generated by an executed application on the outer display region while the terminal body is in the folded configuration; and application information related to the event on the first region or the second region in response to opening the terminal body from the folded configuration; wherein the application information is displayed based on an opening amount of the terminal body.

In an embodiment of the present invention, the controller is further configured to cause the display to display: an execution screen of the executed application on one of the first region or second region; and corresponding first screen information or second screen information on the other of the first region or second region.

In an embodiment of the present invention, the specific region defines a division between a first region and a second region of the inner display region; the controller is further configured to cause the display to display: a notification of an event on the first region while the terminal body is in the open configuration; at least one icon in response to a touch drag input to the specific region, the at least one icon displayed along a path of the touch drag input and related to the event; and an execution screen of an application corresponding to the at least one icon on the first region or the second region in response to a another touch drag input dragging the at least one icon to the corresponding first region or second region.

In an embodiment of the present invention, the controller is further configured to terminate the displaying of the first screen information or the second screen information and cause the display to display an execution screen of a preset application in response to the terminal body being bent about the specific region.

In an embodiment of the present invention, the display further comprises an outer display region disposed on the outer side, the outer display region continuous with the inner display region; and the controller is further configured to cause the display to display: information previously displayed on the inner display region on the outer display region when a touch input is received at the specific region and the terminal body is converted from the open configuration to the folded configuration; and information previously displayed on the outer display region on the inner display region when the terminal body is converted from the folded configuration to the open configuration and a touch input is received at the specific region.

To achieve these and other advantages and objects of the present invention, there is provided a method for controlling a mobile terminal comprising a terminal body, the method comprising: displaying first screen information corresponding to a first application on a display of the mobile terminal; displaying second screen information related to the first screen information on the display in response to a bending event of the terminal body about a specific region of the display; and terminating displaying of the first screen information or the second screen information and displaying third screen information when an angle of the bending event is less than a threshold value.

BRIEF DESCRIPTION OF THE DRAWING

FIG. 6 is a representative exemplary view illustrating a method to display different screen information according to a folded degree of a specific region, in a mobile terminal according to the present invention;

FIG. 8B is a view illustrating that different screen information is displayed by applying a preset touch input to a specific region in a mobile terminal according to the present invention;

FIGS. 11A, 11B and 11C are exemplary views illustrating a method to change a display setting using a touch input applied to a specific region, in a state that a mobile terminal is folded at a predetermined angle according to the present invention;

DETAILED DESCRIPTION OF THE PREFERRED EMBODIMENT

Description will now be given in detail according to embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. The accompanying drawings are used to help easily understand various technical features and it should be understood that the embodiments presented herein are not limited by the accompanying drawings. As such, the present invention should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another.

When an element is referred to as being "connected with" another element, the element can be connected with the other element or intervening elements may also be present. In contrast, when an element is referred to as being "directly connected with" another element, there are no intervening elements present. A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A mobile terminal in the present description may include a portable phone, a smart phone, a notebook computer, a digital broadcasting terminal, Personal Digital Assistants (PDA), Portable Multimedia Player (PMP), a navigation system, a slate PC, a tablet PC, an ultra book, a wearable device (e.g., smart watch), a glass-type terminal (e.g., smart glass), a head mounted display (HMD), etc.

However, the present invention may be also applicable to a fixed terminal such as a digital TV, a desktop computer and a digital signage, except for specific configurations for mobility.

Figure 1A:
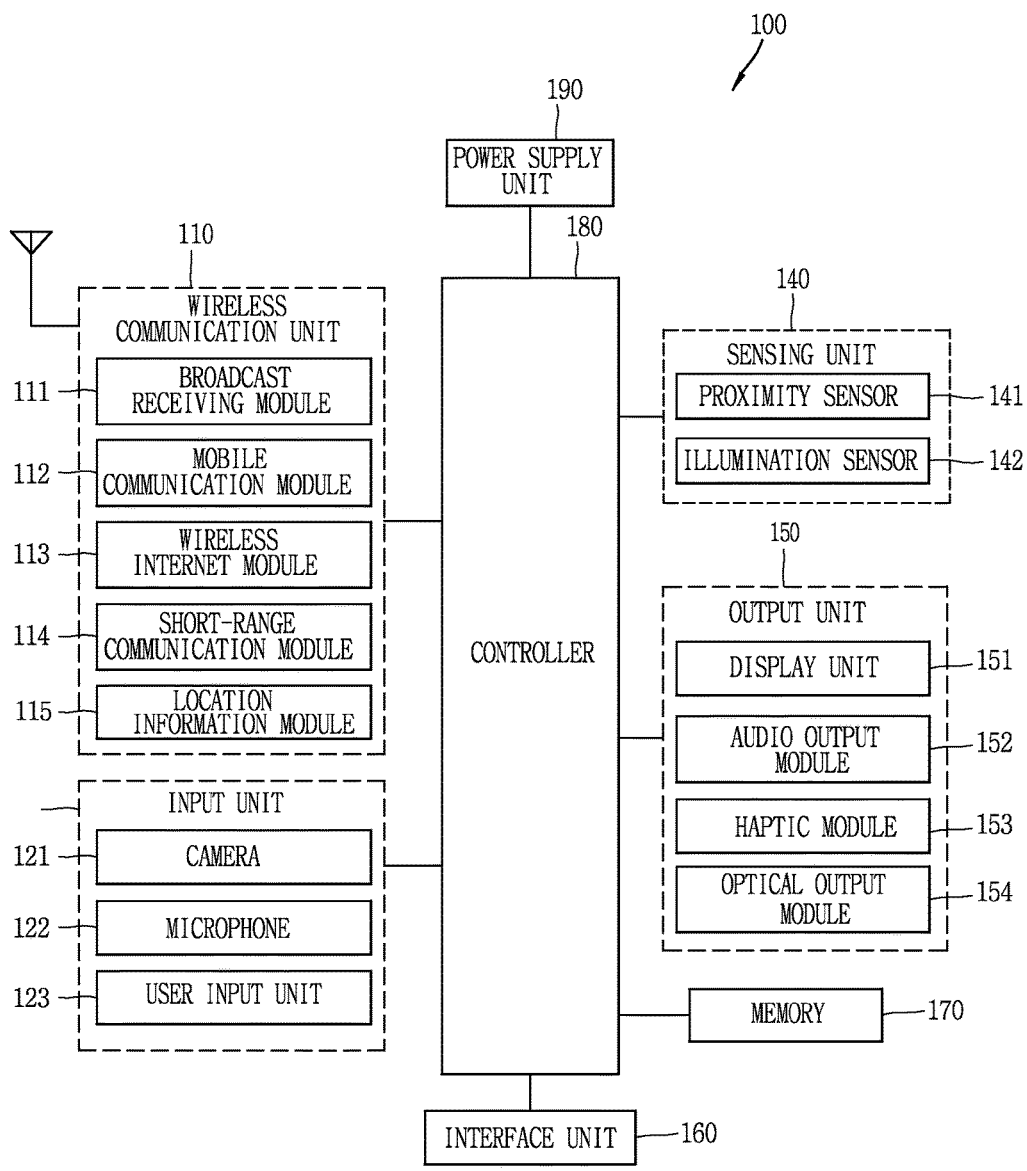
FIG. 1A is a block diagram illustrating a mobile terminal according to the present invention.

FIG. 1A is a block diagram of a mobile terminal according to an embodiment of the present invention.

The mobile terminal 100 is shown having components such as a wireless communication unit 110, an input unit 120, an electromagnetic wave generation unit 130, a sensing unit 140, an output unit 150, an interface unit 160, a memory 170, a controller 180, and a power supply unit 190. Implementing all of the illustrated components of FIG. 1A is not a requirement, and greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), Long Term Evolution (LTE), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The user input unit 123 may recognize information sensed by the sensing unit 140, as well as by the aforementioned mechanical input means and touch type input means, as information input from a user. Accordingly, the controller 180 can control an operation of the mobile terminal 100 corresponding to the sensed information.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Meanwhile, according to the present invention, it is possible to display information processed in a mobile terminal using a flexible display unit. Hereinafter, displaying information using such a flexible display unit will be described in more detail with reference to the accompanying drawings.

Figure 1B:
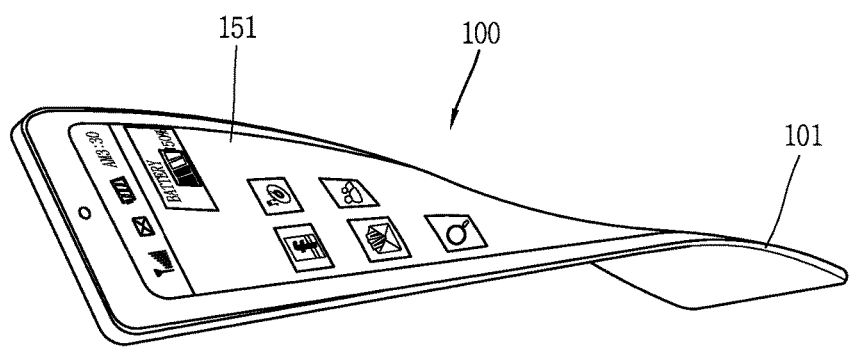
FIG. 1B is a schematic view illustrating another example of a convertible mobile terminal according to the present invention.

FIG. 1B is a conceptual view of a deformable mobile terminal 100 according to an alternative embodiment of the present invention.

In this figure, mobile terminal 100 is shown having display unit 151, which is a type of display that is deformable by an external force. This deformation, which includes display unit 151 and other components of mobile terminal 100, may include any of curving, bending, folding, twisting, rolling, and combinations thereof. The deformable display unit 151 may also be referred to as a "flexible display unit." In some implementations, the flexible display unit 151 may include a general flexible display, electronic paper (also known as e-paper), and combinations thereof. In general, mobile terminal 100 may be configured to include features that are the same or similar to that of mobile terminal 100 of FIGS. 1A and 1B.

The flexible display of mobile terminal 100 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display unit 151 is not deformed (for example, in a state with an infinite radius of curvature and referred to as a first state), a display region of the flexible display unit 151 includes a generally flat surface. When in a state that the flexible display unit 151 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit 151 may be a curved state (for example, a state of being curved from up to down or from right to left), instead of being in flat state. In this embodiment, when an external force is applied to the flexible display unit 151, the flexible display unit 151 may transition to the second state such that the flexible display unit is deformed into the flat state (or a less curved state) or into a more curved state.

If desired, the flexible display unit 151 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 100 to include a deformation sensor which senses the deforming of the flexible display unit 151. The deformation sensor may be included in the sensing unit 140.

The deformation sensor may be located in the flexible display unit 151 or the case 101 to sense information related to the deforming of the flexible display unit 151. Examples of such information related to the deforming of the flexible display unit 151 may be a deformed direction, a deformed degree, a deformed position, a deformed amount of time, an acceleration that the deformed flexible display unit 151 is restored, and the like. Other possibilities include most any type of information which can be sensed in response to the curving of the flexible display unit or sensed while the flexible display unit 151 is transitioning into, or existing in, the first and second states. In some embodiments, controller 180 or other component can change information displayed on the flexible display unit 151, or generate a control signal for controlling a function of the mobile terminal 100, based on the information related to the deforming of the flexible display unit 151. Such information is typically sensed by the deformation sensor.

The mobile terminal 100 is shown having a case 101 for accommodating the flexible display unit 151. The case 101 can be deformable together with the flexible display unit 151, taking into account the characteristics of the flexible display unit 151.

A battery (not shown in this figure) located in the mobile terminal 100 may also be deformable in cooperation with the flexible display unit 151, taking into account the characteristic of the flexible display unit 151. One technique to implement such a battery is to use a stack and folding method of stacking battery cells.

The deformation of the flexible display unit 151 not limited to perform by an external force. For example, the flexible display unit 151 can be deformed into the second state from the first state by a user command, application command, or the like.

Figure 2A:
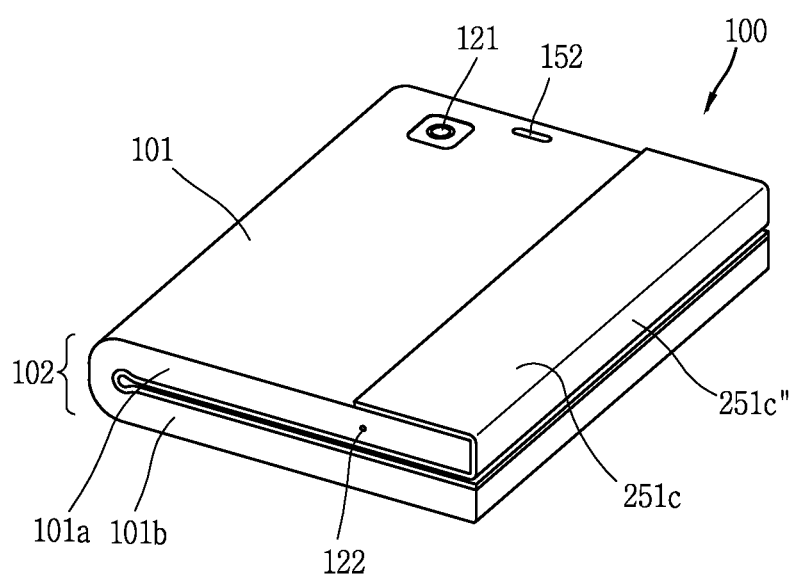
FIGS. 2A and 2B are views illustrating a mobile terminal according to the present invention, viewed from different directions in a closed state.
Figure 2B:
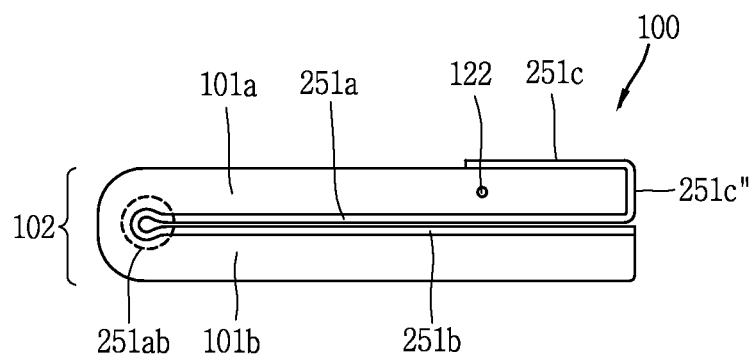

FIGS. 2A and 2B are views illustrating a mobile terminal according to the present invention, viewed from different directions in a closed state.

A folder type terminal body according to the present invention may include a first body 101a and a second body 101b which is formed to be folded or unfolded in at least one end of the first body 101a. As shown in FIGS. 2A and 2B, a state that the first body 101a and the second body 101b are disposed to be overlapped with each other, that is, a state that the first body 101a and the second body 101b are folded to each other so that they may center around a hinge 102, may be referred to as a "closed (folded) configuration". In such a closed configuration, that is, in a closed state, the first and second bodies 101a and 101b may be disposed to face with each other.

Under the closed configuration, a display region 251c disposed at an outer surface and a side extension display region 251c" extended from the display region 251c and disposed at a side surface may be further provided. In such a case, one side (not shown) of the side extension display region 251c" may be extended to one side of the display regions 251a and 251b which are covered by the first and second bodies 101a and 101b. Further, the display region 251c which is disposed at an outer surface and one side (for instance, an edge region) of the side extension display region 251c" may be partially covered by a case or a cover.

In the present invention, the display unit 151 (refer to FIG. 1A) may be formed to have a plurality of regions which are connected to each other, and at least part of the plurality of the regions may be folded or unfolded in a preset direction. Further, according to the present invention, since the display unit 151 is configured to display by unfolding all the plurality of regions in an 'open configuration' (hereinafter, referred to as 'an extended open configuration' to distinguish this configuration from a case that inner display regions 251a and 251b are exposed to a front surface), and also possible to display through at least the outer display region 251c, or both the outer display region 251c and the side extension display region 251c", display may be performed through a more large-sized screen.

In the present invention, the 'closed configuration' may mean a state that the first region 251a and the second region 251b of the display region disposed in an inner surface are disposed to face with each other so that the first region 252a and the second region 251b can not be exposed to outside. In this case, the display region 251c which is disposed on an outer surface may be formed at a case in a folded manner.

Meanwhile, though not shown, the side extension display region which is connected to the outer surface display region may have a predetermined curvature. In such a case, the outer display region 251c and the side extension display region 251c" may be connected to each other in a rounded manner to display. Thus, at least part of the outer display region 251c and the side extension display region 251c" may be simultaneously exposed to the front even under the 'closed configuration', The hinge unit 102 is configured to support the display regions 251a and 251b which are disposed on an inner surface to be partially or entirely folded based on a corresponding region.

In the present invention, a display region corresponding to the hinge unit 102 is referred to as a 'specific region 251ab'.

The specific region 251ab is disposed between the inner display regions 251a and 251b, and more specifically, the specific region 251ab is disposed such that one part thereof is overlapped with part of the first region 251a and the other part thereof is overlapped with part of the second region 251b. Further, the display regions 251a and 251b may be partially or entirely folded based on the specific region 251ab, and divided into the first region 251a and the second region 251b. Further, in the specific region, sensors (for instance, a fingerprint sensor) may be further provided which are distinguished from other regions of the inner display regions 251a and 251b.

Under the closed configuration, the display regions 251a and 251b which are folded by a movement of the hinge unit 102 may be provided in the first body 101a and the second body 101b, respectively, and the hinge unit 102 supports the display regions 251a and 251b to be folded within a range of a specific angle, for instance, a range of 0° to 180°, or a range of 0° to 360° according to the structure of the hinge unit 102, based on the specific region 251ab, for instance on a center portion.

The first body 101a and the second body 101b may include a case 101 (a casing, a housing, a cover, and the like) which constitutes an external appearance. In the present embodiment, the case 101 may be divided into a front case and a rear case. Here, in a space formed between the front case and the rear case, various electronic components may be contained. At least one intermediate case may be further disposed between the front case and the rear case.

Further, the case 101 may be formed by a synthetic resin mold, or formed of a metal, for instance, stainless steel (STS) or titanium (Ti).

At one side of the case, mainly the front case, constituting an external appearance of the first body 101, an outer display 251c" which is extended from an inner surface, a sound output unit 152, a camera module 121, and the like may be disposed. And at one side (for instance, a left surface) which is extended from the front case, the hinge unit 102 is disposed, and at the other side (for instance, a right surface), the side extension display region 215c" which is extended from the inner display regions may be disposed.

Meanwhile, on an outer display region 251c, visual information related to information which is processed at the inner display regions 251a and 251b in the mobile terminal 100 may be displayed. For instance, execution screen information of an application program which is operated in the mobile terminal 100, or User Interface (UI) and Graphic User Interface (GUI) information according to the execution screen information, and User Interface (UI) and Graphic User Interface (GUI) information related to an execution screen which is processed in the inner display regions 251a and 251b, may be displayed.

The display unit 151 may include at least one of Liquid Crystal Display (LCD), Thin Film Transistor Liquid Crystal Display (TFT LCD), Organic Lighting-Emitting Diode (OLED), flexible display, 3-D display, and e-ink display.

In another embodiment, the display unit may be a flexible display. The flexible display may include a display which may be bent, curved, twisted, folded, and rolled by an external force. Here, the flexible display may include both the general flexible display and the electronic paper. Owing to such flexible features of the material, a terminal body having a display unit at least part of which may be folded or bent can be constituted.

Further, the display unit may include a touch sensor to sense a touch applied to the display unit so that the display unit can receive a control command through a touch method.

As such, when a touch is applied to the side extension display region 251c" and the outer display region 251c, the touch sensor senses the touch input, and the controller may be configured to generate a control command corresponding to the touch. The content input in the touching manner may be texts, numerical values, or menu items which can be indicated or designated in various modes.

Meanwhile, the touch sensor may be formed in a film shape having touch patterns and disposed between a window and a display disposed on a rear surface of the window, or may be a metal wire which is directly patterned on a rear surface of the window. Alternatively, the touch sensor may be formed integrally with the display unit. For instance, the touch sensor may be disposed on a display substrate, or provided within the display unit.

As aforementioned, the display unit may constitute a touch screen together with the touch sensor, and in this case, the touch screen may function as a user input 123 (refer to FIG. 1). Further, such features of the display unit may be equally applied to the display regions 251a and 251b which are disposed within an inner surface so as to be connected to the side extension display region 251c".

The sound output unit 152 may be disposed at one front region where the outer display region 251c is disposed, and may include sound holes for discharging sound. However, the present invention is not limited to this, and the sound output unit 152 may be constituted such that sound may be discharged through a gap between structures (for instance, a gap between a window and a front case). In this case, since the holes for discharging sound are formed so as not to be seen or in a hidden manner, an external appearance in the mobile terminal 100 may be simplified. Further, though not shown, the sound output unit 152 may be further provided at a rear surface in the mobile terminal 100.

The camera module 121 may be disposed at one front region where the outer display region 251c is disposed adjacent to the region where the sound output unit 252 is disposed. The camera module 121 may process image frames of still images or moving images which are obtained by an image sensor in a capturing mode or a video call mode. The processed image frames may be displayed on the display unit 151, especially on the outer display region 251c, and may also be stored in the memory 170.

Meanwhile, a camera module may be additionally mounted within the terminal body. In such a case that a camera module is additionally mounted within the terminal body, the camera module may be implemented as a camera that has a substantially opposite capturing direction to and different pixels from the camera 121.

For instance, the camera module 121 may have low pixels so as to capture and send a user's face to other part in a video call mode without any difficulty, while the newly mounted camera module may preferably have high pixels because it captures common subjects and then normally does not send the captured images to others. Such camera modules may be mounted in the terminal body in a rotatable manner or to be able to popup.

Further, though not shown, as another example of a user input unit 123, a rear input unit may be provided at a rear surface in the mobile terminal 100. Such a rear input unit is configured to receive an input of a control command to control an operation in the mobile terminal 100, and the input control commands may be set in various types. For instance, the rear input unit may receive an input of a command such as a power on/off, start, end, and scroll, and a command such as a volume control of a sound output from a sound output unit 152 and a command for conversion of display unit into a touch recognition mode. The rear input unit may be implemented in a type that may receive an input of a touch input, a push input, or a combination thereof.

Figure 2C:
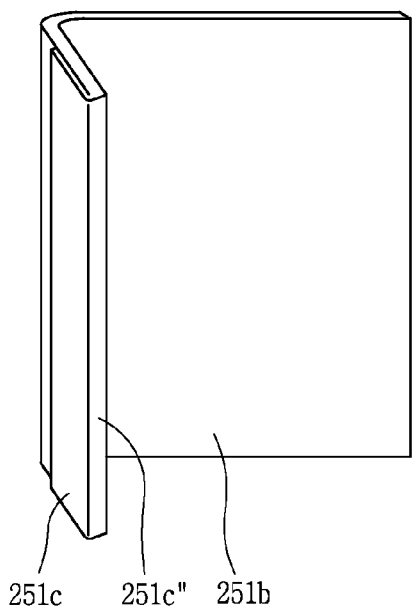
FIGS. 2C, 2D and 2E are views illustrating a mobile terminal viewed from an upper side in a partially or entirely open state according to the present invention.
Figure 2D:
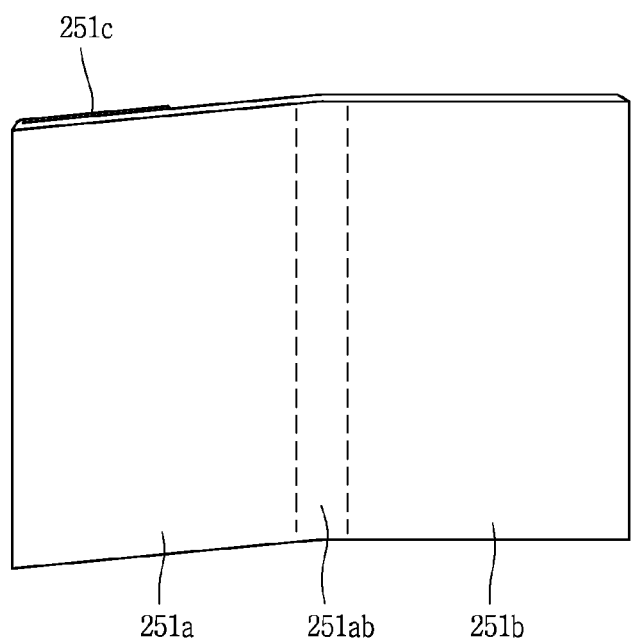
Figure 2E:
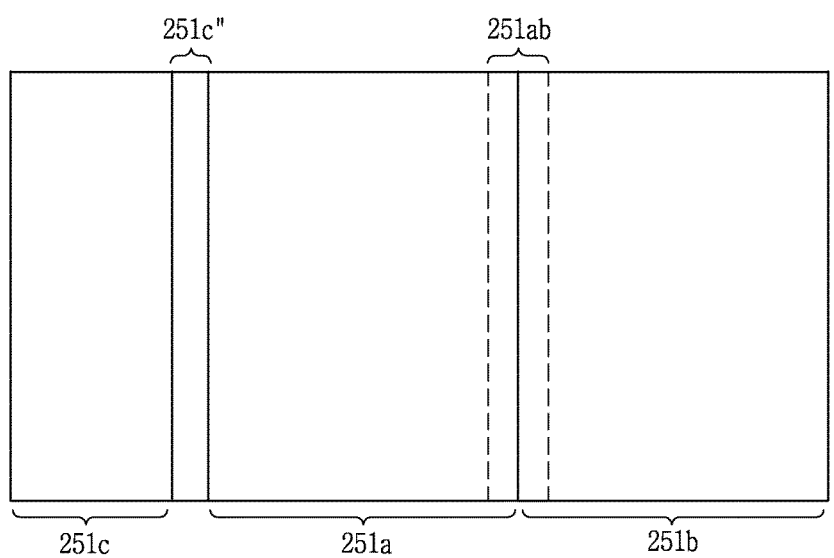

FIGS. 2C, 2D and 2E are views illustrating a mobile terminal viewed from an upper side in a partially or entirely open state (configuration) according to the present invention;

In the present invention, the "open (unfolded) configuration" may be referred to as a state that an inner surface of a terminal is exposed, that is, a plurality of display regions 251a and 251b disposed within the mobile terminal are partially or entirely unfolded based on the hinge unit 102 or the specific region 251ab and exposed to the front. This is similar to just like a state that a book is open.

For instance, FIG. 2C shows a partially open state that inner display regions 251a and 251b are folded half based on the specific region so as to be a partially open state in which only the second region 251b and the side display region 251c" are exposed to the front. Further, FIG. 2D shows an entirely open state that the display regions 251a and 251b are open to form a same plane, or at least one is slightly bent so that both the first region 251a and the second region 251b are exposed to the front. Furthermore, FIG. 2E shows a state that the inner display regions 251a and 251b, the outer display region 251c, and the side extension display region 251c" are all exposed to the front to form a same plane. This state is referred to as an 'extended open state (configuration)' to distinguish from the aforementioned entirely open state (configuration), in the present invention.

As described above, the open state (configuration) may include not only a state that the inner display regions 251a and 251b are unfolded in flat, but also a 'folded state' that the inner display regions 251a and 251b are bent at a predetermined angle based on the specific region. The inner display regions 251a and 251b may be folded or unfolded based on the specific region 251ab at a predetermined angle, for instance, within a range of 0°~240° or 0°~360° depending upon a structure of the hinge unit 102 enclosing the specific region 251ab. The 'folded state' is a state that the first region 251a and the second region 251b form a predetermined angle based on the specific region 251ab, or a state that the outer display region 251c and the inner display regions 251a and 251b form a predetermined angle based on the side extension display region 251c" in a state that the terminal is in an entirely open state or an extended open state.

Meanwhile, when a support is made to a case where the hinge unit 102 corresponding to the specific region 251ab is bent backward at a predetermined angle, a sensor (not shown) may be configured to sense separately a case that the hinge unit 102 is bent backward and a case that the hinge unit 102 is bent forward, respectively.

Referring to FIGS. 2D and 2E, in the open state of a terminal, a specific region 251ab may be disposed between the inner display regions 251a and 251b. The specific region 251ab may further include various sensors (for instance, a touch sensor, a fingerprint sensor, a proximity sensor, a motion sensor, an optical sensor, an ultrasonic sensor, a thermal sensor, and a temperature sensor) which are distinguished from the inner display regions 251a and 251b. Further, the specific region 251ab may be converted into an activated state when the first region 252a and the second region 251b are in a 'folded state' i.e., they form a predetermined angle therebetween, while being usually in an inactivated state.

Figure 3A:
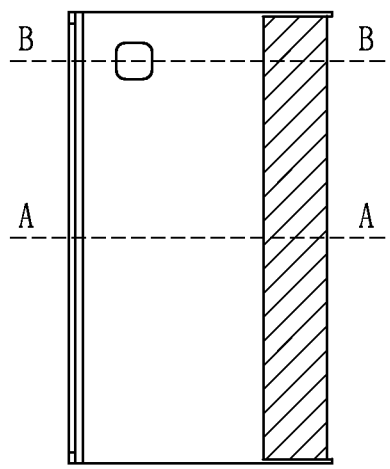
FIG. 3A is a plan view of a mobile terminal.
Figure 3B:
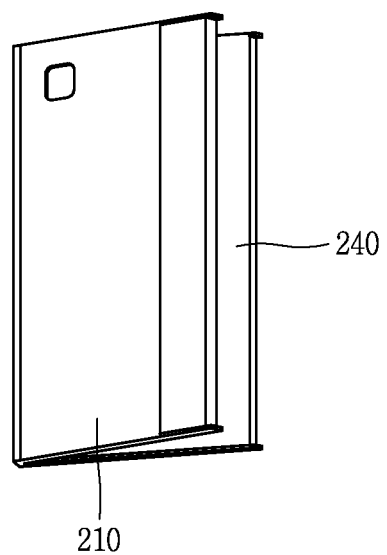
FIG. 3B is a perspective view illustrating a mobile terminal in a partially open state according to the present invention.

FIG. 3A is a plan view in the mobile terminal, and FIG. 3B is a perspective view illustrating a mobile terminal in a partially open state according to the present invention. As shown in FIGS. 3A and 3B, an edge in the mobile terminal according to the present invention is formed to protrude over the display unit 240 so that an impact may not be transmitted to the display unit 240, but to the case when the mobile terminal is dropped.

FIGS. 4A through 4H are exemplary views illustrating parts in the mobile terminal which is cut at various angles according to the present invention.

Figure 4A:
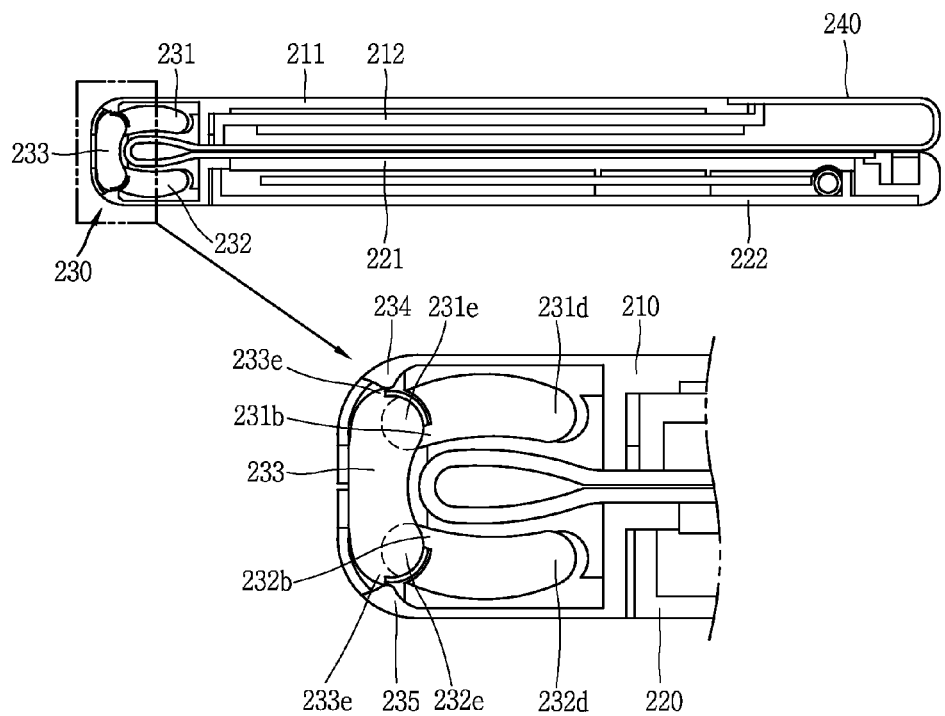
FIGS. 4A, 4B, 4C, 4D, 4E, 4F, 4G and 4H are exemplary views illustrating parts of a mobile terminal which is cut at various angles according to the present invention.
Figure 4B:
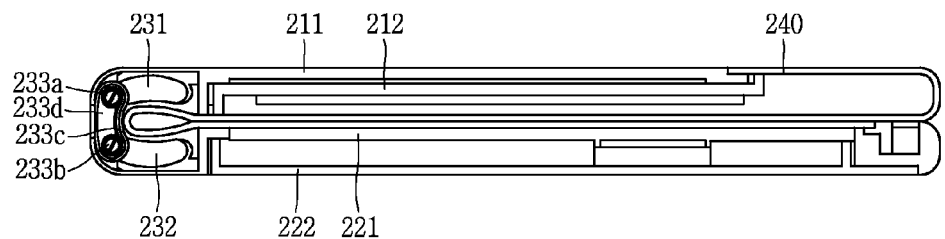
Figure 4C:
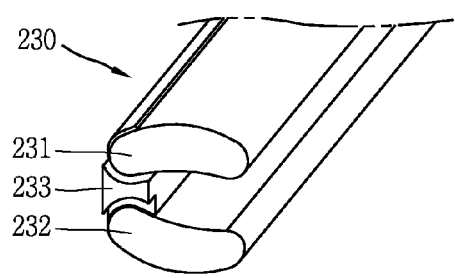
Figure 4D:
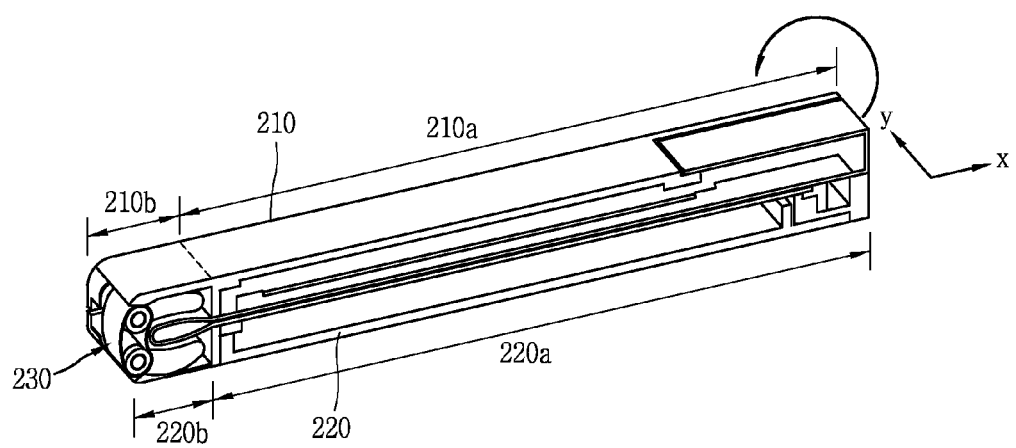
Figure 4E:
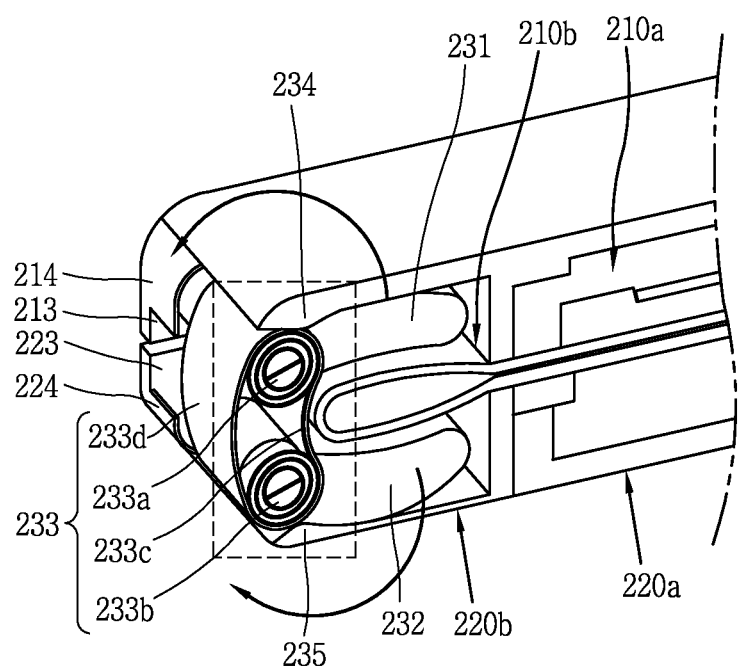
Figure 4F:
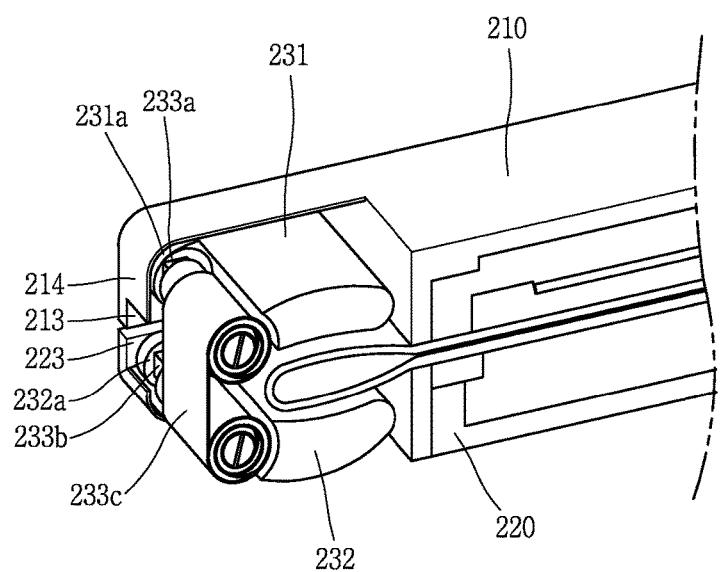

FIG. 4A is a sectional view taken along line AA of FIG. 3A, FIG. 4B is a sectional view taken along line BB of FIG. 3A, FIG. 4C is a view illustrating an example of a hinge unit according to the present invention, FIG. 4D is a perspective view taken along line BB of FIG. 3A, FIG. 4E is a partial enlarged view of FIG. 4D, and FIG. 4F is a perspective view in which a first case is removed from FIG. 4E.

Referring to FIGS. 4A through 4F, the mobile terminal according to the present invention has a structure that a connection portion 230 is provided at a portion where a first case 210 and a second case 220 are connected. The connection portion 230 is provided at an end portion of the first case 210 and second case 220 so that the first case 220 and the second case 220 may be relatively rotated with each other. Further, the connection portion 230 includes a first connection portion 231 having one end 231d connected to an end of the first case 230 and configured to rotate integrally with the first case 220, a second connection portion 232 having one end 232d connected to an end of the second case 220 and configured to rotate integrally with the second case 220, and a rotating portion 233 connected to other ends 231e and 232e of the first connection portion 231 and second connection portion 232 and configured to rotate the first and second connection portions 231 and 232. Here, a curved portion 243 connecting a first portion 241 and a second portion 242 is bent at a predetermined curvature in a 'closed state' of the terminal. That is, the curved portion 243 means a portion where the display 240 is curved to maintain a closed state.

In one embodiment of the present invention, the first case 210 includes a first body 210a in which electronic components are contained and formed in a lengthwise direction (X direction in FIG. 4D), and a first bent portion 210b extended from the first body 210a and bent to enclose the connection portion 230. Also, similarly to the first case 210, the second case 220 includes a second body 220a in which electronic components are contained and formed in a lengthwise direction (X direction in FIG. 4D), and a second bent portion 220b extended from the second body 220a and bent to enclose the connection portion 230.

The first body 210a and the second body 220a are formed to face each other in a closed state, and the first bent portion 210b and the second bent portion 220b are also formed to face each other in a closed state.

As aforementioned, in one embodiment of the present invention, the mobile terminal includes the first case 210 and the second case 220, but since they have the same structure, it will be appreciated that the term, 'first' and 'second' refer to items of the first case 210 and the second case 220 while designating one portion of the first and second cases 210 and 220, excluding specific instances. For instance, a first cover portion 214 is indicative of a part of the first case 210, and a second cover portion 224 is indicative of a part of the second case 220. Further, same or similar parts are indicated with same or similar reference numerals, and iteration of the explanation thereof will be omitted for clarity purposes. That is, two numerals at the end of the reference numerals indicate the same parts in the various embodiments which will be described hereinafter, excluding specific instances.

The first bent portion 210*b* includes a first wall portion 213 which forms an external appearance of upper and lower ends in the mobile terminal 200, and a first cover portion 214 integrally formed with the first wall portion 213 in a widthwise direction in the mobile terminal 200, Similarly, the second bent portion 220*b* includes a second wall portion 223 which forms an external appearance of upper and lower ends in the mobile terminal 200, and a second cover portion 224 integrally formed with the second wall portion 223 in a widthwise direction in the mobile terminal 200, Here, the upper and lower ends mean upper and lower portions when the mobile terminal 200 is in an open state, and the widthwise direction means a height in the mobile terminal 200.

The first wall portion 213 and the second wall portion 223 are extended from the first body 210*a* and the second body 220*a*, and integrally formed with a vertical portion 223*a* of the first body 210*a* and the second body 220*a*.

As aforementioned description may be applied to the embodiments which will be described hereinafter, detailed description will be omitted in the following embodiments, for clarity purposes.

In one embodiment, each end of the first connection portion 231 and the second connection portion 232 is connected to the first wall portion 213 and the second wall portion 223, respectively, so that the first case 210 and the second case 220 may be rotated as the first and second connection portions 231 and 232 rotate. To this end, a rotation member 233 includes a first rotation shaft 233*a* having one end connected to the first connection portion 231 so as to be integrally rotated with the first connection portion 231, a second rotation shaft 233*b* having one end connected to the second connection portion 232 so as to be integrally rotated with the second connection portion 232, and an elastic member 233*c* formed at the first and second rotation shafts 233*a* and 233*b* and configured to rotate the first and second rotation shafts 233*a* and 233*b*. The first and second connection portions 231 and 232 may be fixed to the first and second wall portions 213 and 223, respectively, and the elastic member 233*c* may be formed to enclose the first and second rotation shafts 233*a* and 233*b*.

As the elastic member 233*c*, any member which can provide a restoration force to the first and second connection portions 231 and 232 may be used. Therefore, the present invention is not limited to the elastic member 233*c*. For instance, the elastic member 233*c* may be a spiral spring that can be wound or unwound at both sides.

The first and second connection portions 231 and 232 include first and second bottom portions 231*a* and 232*a*, respectively, which are inserted and fixed to the first and second wall portions 213 and 223, respectively. That is, as shown in FIG. 4F, the first and second connection portions 231 and 232 are fixed to the first and second wall portions 213 and 223, respectively, and the first and second bottom portions 231*a* and 231*a* are provided to fix the first and second rotation shafts 233*a* and 233*b* to the first and second connection portions 231 and 232, respectively. By this arrangement, the first and second rotation shafts 233*a* and 233*b* may be inserted and fixed to the first and second bottom portions 231*a* and 232*a*.

The elastic member 233*c* may be, for instance, a spiral spring, and the spiral spring is wound around the first and second rotation shafts 233*a* and 233*b* several times so as to provide a restoration force thereto. Here, when the first and second rotation shafts 233*a* and 233*b* are formed to have a section in the form of a polygon or an oval, the first and second connection portions 231 and 232 may be rotated by a rotation of the first and second rotation shafts 233*a* and 233*b*. However, the present invention is not limited to this arrangement, but it is sufficient for the first and second connection portions 231 and 232 to be rotated by a rotation of the first and second rotation shafts 233*a* and 233*b* with any other arrangements.

A coupling portion 230 may be formed at both ends in the mobile terminal 200 in a width direction, but not limited to this. That is, the coupling portion 230 may be formed at a middle portion in the mobile terminal 200, and similar to that in the embodiments which will be described hereinafter.

Further, as shown in FIG. 4E, the first and second rotation shafts 233*a* and 233*b* and the elastic member 233*c* are enclosed by a support portion 233*d*, and the support portion 233*d* functions to support the first and second shafts 233*a* and 233*b* and the elastic member 233*c*. The inner part of the support portion 233*d* excluding a portion that encloses the first and second rotation shafts 233*a* and 233*b* and the elastic member 233*d*, may be filled up.

Figure 4G:
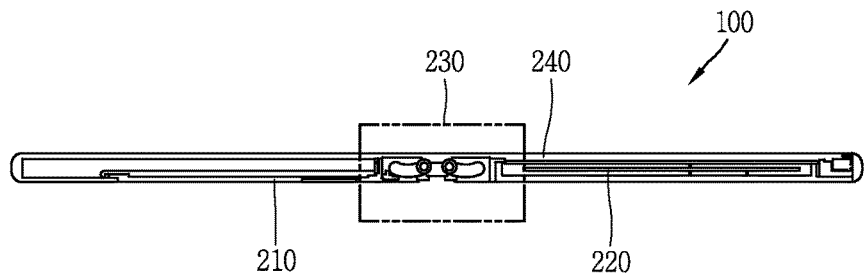
Figure 4H:
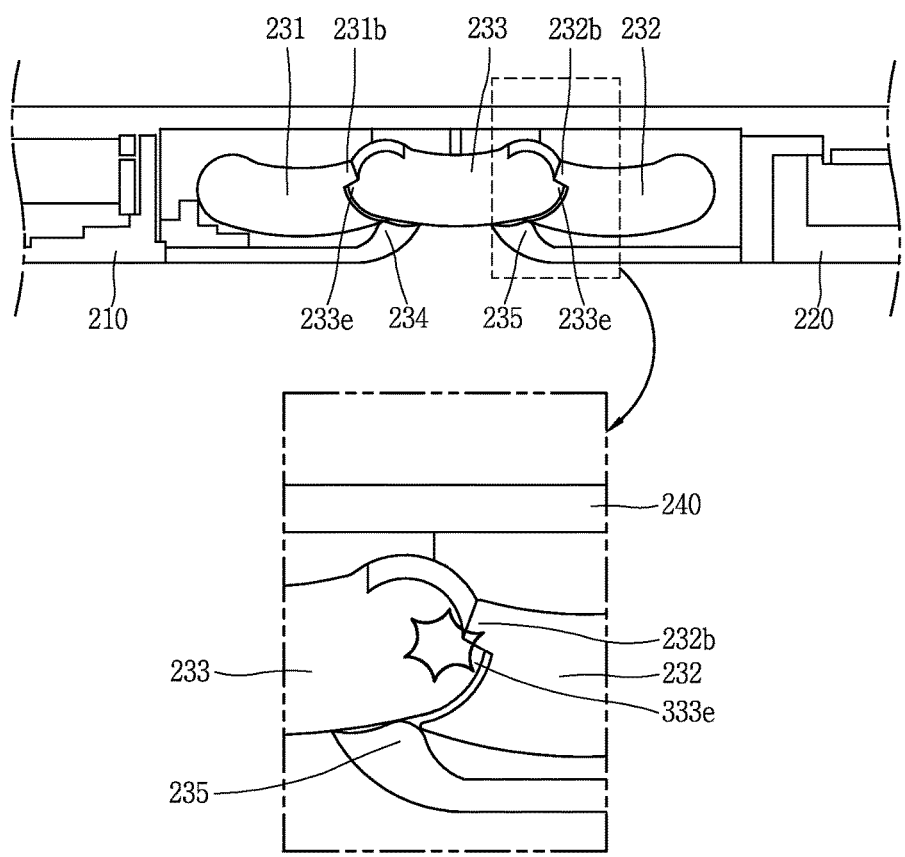

Referring to FIGS. 4G and 4F, a rotation member 233, more specifically, the support portion 233*d* and the first and second connection portions 231 and 232 are rotated while contacting or almost contacting with each other.

In this case, a means to prevent the first and second connection portions 231 and 232 from being excessively rotated is required. To this end, according to one embodiment, the first and second connection portions 231 and 232 are rotated along an outer circumferential surface of the support portion 233*d*. And the first and second connection portions 231 and 232 include first and second protrusions 231*b* and 232*b*, respectively, and the support portion 233*d* includes a hooking jaw 233*e* at its outer circumferential surface which is configured to contact with the first and second protrusions 231*b* and 232*b* of the first and second connection portions 231 and 232 to limit rotation of the first and second connection portions 231 and 232.

The first and second connection members 231 and 232 rotate along an outer circumferential surface of the rotation member 233, and in this case, as the first and second protrusions 231*b* and 231*b* formed on the first and second connection portions 231 and 232 are engaged with the hooking jaw 233*e* of the support portion 233*d*, an excessive rotation of the first and second connection members 231 and 232 may be prevented.

In this case, a pair of hooking jaws 233*e* is provided spaced apart from each other at both sides of the rotation member 233 so as to correspond to the first and second protrusions 231*b* and 232*b* of the first and second connection members 231 and 232. More specifically, the hooking jaws 233*e* are formed to be perpendicular to the display unit 240 in a closed state. As such, the positions of the hooking jaws 233*e* must be maintained in a perpendicular state to the display unit 240 in a closed state, such that the first case 210 and second case 220 are converted into an open configuration by being rotated by an angle of 90°, respectively.

Moreover, in one embodiment of the present invention, first and second protrusions 234 and 235 may be provided at an inner circumferential surface in a widthwise direction of the first and second cover 214 and 224 to limit rotation of the first and second connection members 231 and 232. That is, primarily, rotation of the first and second connection members 231 and 232 may be limited by coupling of the first and second protrusions 231*b* and 232*b* to the hooking jaws 233*e*. Secondarily, an excessive rotation of the first and second covers 214 and 224 may be limited by the first and second protrusions 234 and 235. Furthermore, the first and second protrusions 234 and 235 are operated to lift up the support portion 233*d*.

That is, when the mobile terminal 200 is converted from a closed configuration into an open configuration, the support portion 233d disposed at a lower portion of the display unit 240 may be moved upward so as to be in contact with or without the display unit 240. In this case, when the support portion 233d is in contact with the display unit 240, it may be possible to support the display unit 240. More specifically, the first and second covers 214 and 224 include facing portions 214b and 224b which face each other and spaced portions 214a and 224a which are spaced apart from each other in the open configuration, respectively, and the facing portions 214b and 224b may be spaced apart from each other at a predetermined gap in the open configuration.

Figure 5A:
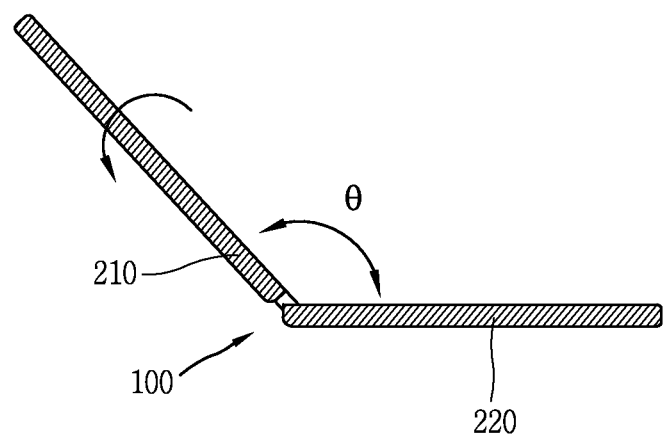
FIGS. 5A and 5B are views for explaining a folding event which is generated from a mobile terminal by a hinge related to a specific region according to the present invention.
Figure 5B:
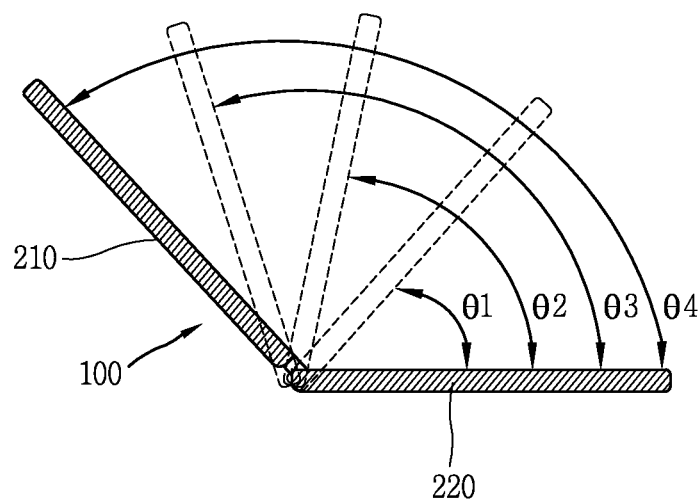

FIGS. 5A and 5B are views for explaining a folding event which is generated in the terminal by a hinge related to a specific region according to the present invention.

In the present invention, a 'folding event' means that as an external force is applied to the body enclosing first and second regions 251a and 251b which are inner display regions in an 'open configuration', the inner displays, i.e., the first and second regions 251a and 251b are bent forward based on the specific region 251ab at a predetermined angle. If a folding event is generated on the specific region 251ab, it may be referred to that the first and second regions 251a and 251b are in a 'closed configuration'.

Unlike this, a 'bending event' means that as an external force is applied to the body enclosing first and second regions 251a and 251b which are inner display regions in an 'open configuration', the inner displays, i.e., the first and second regions 251a and 251b are bent backward based on the specific region 251ab at a predetermined angle. If a bending event is generated on the specific region 251ab, it may be referred to that the first and second regions 251a and 251b are in a 'bent configuration'. In this case, an angle of the backward bending depends on a structure of the hinge unit, and when an external force is removed, the backward bent state is returned to an open configuration, i.e., the first and second regions 251a and 251b are elastically restored into a flat state.

FIG. 5A is a view for explaining a folding state in the mobile terminal by a hinge structure corresponding to a specific region, for instance, by a click hinge, and FIG. 5B is a view for explaining a folding state in the mobile terminal by a hinge structure corresponding to a specific region, for instance, by a free-stop hinge.

The click hinge is adapted to implement a structure that is automatically open or closed when an angle is more than a predetermined value (θ), and the free-stop hinge is adapted to implement a structure that may be open at a desired angle by a user. For instance, as shown in FIG. 5B, a user may open or close at various angles (θ1, θ2, θ3, θ4).

In the present invention, according to a folded degree of the display unit based on a specific region, different screen information is displayed. More specifically, when a display unit is folded at a predetermined angle based on a specific region, screen information related to a screen being currently output to the display unit is output, and when the display unit is further folded based on the specific region, screen information different from the screen being currently output to the display unit is output to one surface of the folded display unit. In this case, the different screen information may be information related to user's individual information or security among the screens being currently output.

FIG. 6 is a representative exemplary view illustrating a method to display different screen information according to a folded degree of a specific region, in a mobile terminal according to the present invention.

As shown in FIG. 6, a display unit 251 includes a first region 251a disposed on a left side of an inner display and a second region 251b disposed on a front right side of the inner display, in the open configuration of the terminal. And a specific region 251ab, on which a folding/unfolding is generated by an external force, is provided between the first region 251a and the second region 251b.

The specific region 251ab is folded or unfolded at a predetermined angle, for instance, 0°~210°, or within a range of 0°~360° according to a structure of the hinge enclosing the specific region 251ab, so that the first region 251a and the second region 251b are distinguished form each other.

As shown in FIG. 6, an execution screen of at least one application, for instance, an execution screen 601 of a web application may be displayed in a large-sized screen on the first and second regions 251a and 251b. However, a method to display a screen on the first and second regions 251a and 251b is not limited to this type of the display method, but plural pages with respect to one application may be displayed on the first and second regions 251a and 251b, respectively, or execution screens of different applications may be displayed on the first and second regions 251a and 251b, respectively.

Under the state, a controller 180 (FIG. 1A) of the terminal may sense that a folding event is generated on the specific region 251ab. Here, the folding event means that as an external force is applied to the body enclosing first and second regions 251a and 251b, the inner displays, i.e., the first and second regions 251a and 251b are bent forward based on a hinge unit enclosing the specific region 251ab at a predetermined angle.

When a folding event is generated on the specific region 251ab, the execution screen 601 is converted into screen information related to a screen being displayed on the first and second regions 251a and 251b. Here, the screen information related to a screen being displayed means screen information that the displayed screen is converted into a state to receive input of a control command, or screen information that a display type of the displayed screen is changed to another method. Further, the screen information related to a screen being displayed may include an execution screen of a previously executed application, or an execution screen of a preset application.

Specifically, when the first region 251a and the second region 251b are relatively rotated based on the specific region 251ab, for instance, as shown in FIG. 6, the first region 251a is rotated in a direction "A" based on the specific region 251ab at a predetermined angle so that the terminal is folded, a display type of the execution screen (601) may be converted from a PC mode into a mobile terminal mode (601"). As a result, plural pages of the execution screen (601") converted into the mobile terminal mode may be displayed on the first region 251a and the second region 251b, respectively, or on only one of the first region 251a and the second region 251b.

Together with such a conversion of display type, an image object, for displaying a predetermined menu related to the execution screen (601") which is converted into a mobile terminal mode, may be displayed at one end, for instance, a lower end of the specific region 251ab.

Here, the image object may include information which informs an input type to display a menu on the screen. For instance, the image object, as shown in FIG. 6, may be an image (for instance, an arrow image) (610) which points a predetermined direction. When a touch input (for instance, a flicking touch input, a drag input, a swipe input, and the like) is applied in a direction pointed by the image (610), a corresponding menu is displayed on the specific region 251*ab* following the touch input. In this case, the display state of the execution screen (601″) is maintained as it is, and the menu is displayed on the specific region 251*ab* in an overlapped manner.

Meanwhile, when the first region 251*a* is further folded forward based on the specific region 251*ab*, as shown in FIG. 6, screen information constituted by security-related information in the execution screen (601) or the execution screen (601″), for instance, a login information input screen (602) is displayed on the second region 251*b*. Here, the security-related information may include login information, digital certification information, a message received from a specified person, and the like.

In this case, the login information input screen (602) may be displayed only on part of the second region 251*b* according to a folded degree of the first region 251*a*. For instance, when the first region 251 is folded so as to be perpendicular to the specific region 251*ab* or more, since an exposed degree of the second region 251*b* is decreased, a relatively small screen may be provided so that the login information input screen (602) may be viewed entirely from the front.

Since a left of the displayed login information input screen (602) is covered by the folded first region 251*a*, a user may input login information which requires security without exposing to others. After inputting the login information, the first region 251*a* is rotated based on the specific region 251*ab* in a direction "B" at a predetermined angle so that the terminal may be open, and thus a login press is executed with the input login information.

And when the mobile terminal is converted into the open state, as shown in FIG. 6, an execution screen (603) of a web application of which a login is executed is displayed on the second region 251*b*, and other screen information, for instance, a home screen (604) to which a plurality of objects (example, an icon of an application, a widget, and the like) are output is displayed on the first region 251*a*.

According to such a driving method, a user may convert simply by folding or unfolding the display unit in an open state of the terminal, and when checking or inputting information requiring security, it is possible to prevent exposure to others.

Figure 7:
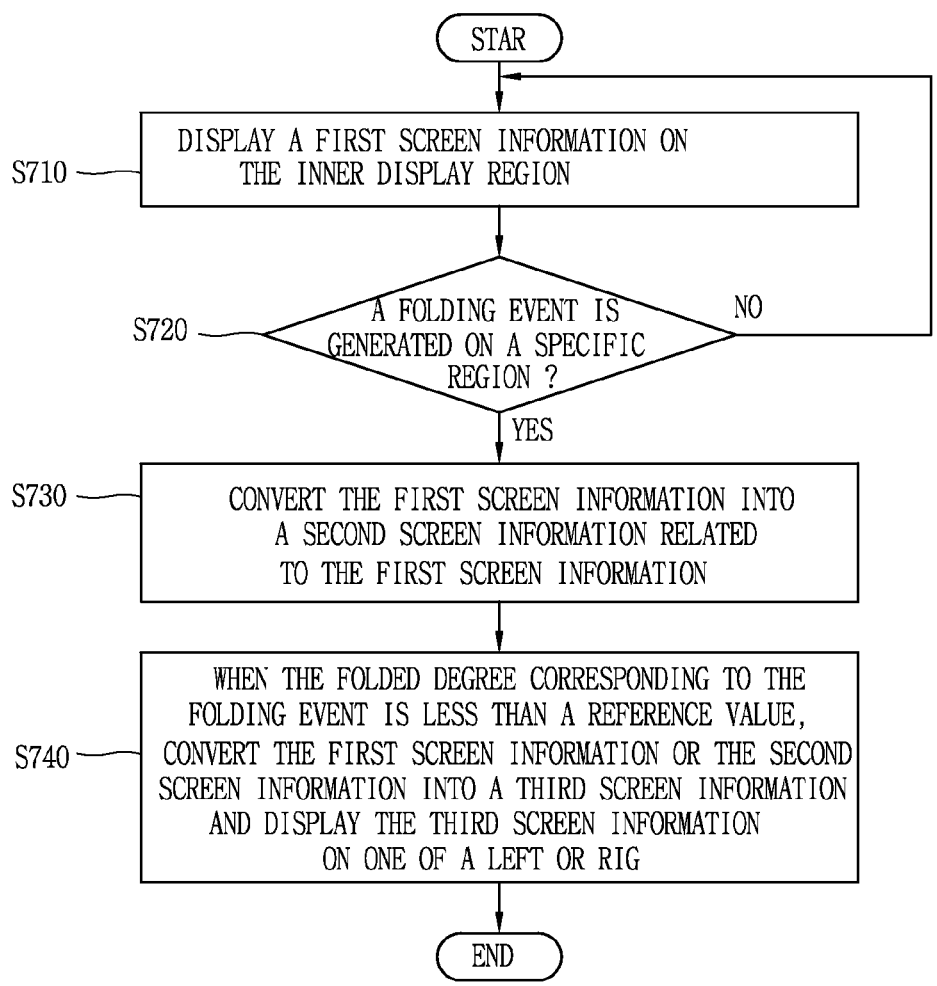
FIG. 7 is a representative flowchart for explaining an operation of a mobile terminal according to the present invention.

FIG. 7 is a representative flowchart for explaining an operation of a mobile terminal according to the present invention.

As shown in the drawing, first screen information is displayed on the inner display region in a state that the mobile terminal according to the present invention is in an open configuration (S710).

Here, the open configuration means, as described above, a state that the display unit disposed within the terminal is partially or entirely unfolded so as to be exposed to the front. Further, the open configuration may include not only a case where the display unit disposed within an inner surface is unfolded to be flat, but also a state where the display unit is bent based on the specific region 251*ab* at a predetermined angle or an extended open configuration where a display unit disposed at an outer surface of the terminal is unfolded.

Here, there is no limitation in the first screen information displayed on the inner display region. For instance, the first screen information may be an execution screen of a specific application (for instance, a web browser, a video reproducing, a schedule management, a call, a game, music, a paperwork. a message, financing, an e-book, traffic information, and an application related to a program to execute an update function of an application), a home screen page, a locking screen, or screen information displayed before the terminal is converted into the closed configuration.

Further, the first screen information may be a single execution screen which is displayed on the entire part of the display unit disposed within an inner surface. For instance, as shown in FIG. 6, the first screen information may be a single execution screen which is displayed on the whole display units 251*a* and 251*b* disposed within an inner surface as a large-sized screen.

Under the state, the controller 180 in the mobile terminal may sense that a folding event is generated on a specific region (S720). When a folding event is generated on a specific region, the display unit disposed within an inner surface of the terminal is folded based on a specific region, and thus may be divided into a first region and a second region.

The specific region is a display region which is disposed between the first region 251*a* and the second region 251*b*, and part of the specific region is overlapped with the first region 251*a* and another part thereof is overlapped with the second region 251*b*. Further, the folding event generated on the specific region means that as an external force is applied to the body enclosing the first and second regions 251*a* and 251*b*, the inner displays, i.e., the first region 251*a* and the second region 251*b* are folded in a direction to be close to each other based on the hinge unit enclosing the specific region 251*ab*.

When the folding event is generated, the controller 180 converts first screen information into second screen information related to the first screen information (S730). Here, the second screen information may be a plurality of execution screens which are displayed on the first region 251*a* and the second region 51*b*, respectively. For instance, in a case where the first screen information is an execution screen of a web application in the PC mode which is displayed on the entire part of the first and second regions 251*a* and 251*b*, the second screen information may be an execution screen or execution screens of a web application in the mobile terminal mode which is displayed on at least one of the first region 251*a* and the second region 251*b*.

In this case, when a folding event is generated on the specific region 251*ab*, the controller 180 may sense a folded degree (folded angle), a folded speed, and a duration time for which a folded state of the display unit is maintained using various sensors. For instance, a sensing unit 140 (refer to FIG. 1A) of the terminal may sense generation of a 'folding event' using more than at least one of a gyro-sensor, a geomagnetic sensor, an accelerometer, and an illumination sensor.

In the present invention, such sensors may be disposed within the specific region 251*ab* of the inner display.

The sensing unit 140 senses an inclined degree (folded degree) of a region of the display based on a ground level, and the sensed result is transmitted to the controller 180. Further, the sensing unit 140 is configured to sense an arrangement angle of the mobile terminal corresponding to the folding event, so as to recognize whether the display is folded in a horizontal direction in a state that the mobile terminal is open in a vertical direction, or the display is folded in a vertical direction in a state that the mobile terminal is open in a horizontal direction.

Then the controller 180 creates differently a control command related to control of a displayed screen by combining at least one of a folded degree, a folded speed, and a duration time for which a folded state of the display unit is maintained. For instance, when the terminal is folded fast based on the specific region 251*ab*, it is possible to convert the mobile terminal into a 'closed configuration' without converting the first screen information into the second screen information. And, for instance, when a folded degree of the mobile terminal is maintained for a predetermined time in a state that the first screen information is converted into the second screen information, the second screen information is continuously maintained even though the mobile terminal is re-unfolded based on the specific region 251ab.

Meanwhile, the folded degree of the terminal may be determined differently according to a relative rotation degree of the first region 251a and the second region 251b based on the specific region 251ab, respectively.

When the folded degree corresponding to the folding event is less than a reference value, the controller 180 converts the first screen information or the second screen information into a third screen information different from the second screen information. And the third screen information may be displayed on one of the first region (left region) 251a or the second region (right region) 251b (S740).

Here, the case that a folded degree is less than a reference value means a case that at least one of the first region 251a and the second region 251b which are inner display regions is relative-rotated based on the hinge unit corresponding to the specific region 251ab so that one of the first and second regions 251a and 251b is maintained in an activated state and the other is converted into an inactivated state (that is, a state that a screen is turned off), thereby maintaining an angle between the first region 251a and the second region 251b to be less than a reference value (for instance, less than 90°).

To this end, the controller 180 may compare the degrees that the first region 251a and the second region 251b are relative-rotated with each other based on the hinge unit corresponding to the specific region 251ab and determine a region where the third screen information is displayed. Specifically, in a case where a rotation degree of the first region 251a is larger than that of the second region 251b, third screen information is displayed on the first region 251a.

Further, the third screen information may be part of a single execution screen displayed on one region having a small relative-rotation degree between the first region 251a and the second region 251b. For instance, the third screen information may be screen information which consists of only security-related information among the first screen information or the second screen information. For instance, the third screen information may be a screen which is obtained by extracting and enlarging only an input screen of login information from an execution screen of a web application which is displayed on the first and second regions 251a and 251b.

While the third screen information is displayed on one of the first region 251a and the second region 251b, the other region 251a or 251b is configured to cover exposure of the third screen information from at least one eyeline (for instance, left/right eyeline). This is similar to the case that when inputting information requiring security, the input information is covered with another hand to prevent exposure to others while checking the input information in a large size.

In this case, the controller 180 may determine differently the size of a region where the third screen information is displayed, according to an exposed degree to the front of a region that has rotated at a smaller degree between the first region 251a and the second region 251b. For instance, as an angle between the first and second regions 251a and 251b becomes smaller, the size of a region (the size of a horizontal region) where the third screen information is displayed may be decreased. In a case where the size of a region where the third screen information is displayed is decreased, the size of an object (for instance, images, texts, and the like) is maintained and the amount of information is decreased.

Meanwhile, a screen change has been described in two steps according to a folded degree (a folded angle) corresponding to the folding event, hereinbefore, but not limited thereto, and may be implemented such that a screen change according to a folded degree (folded angle) is performed in more sub-divided steps, by subdividing a range of an angle between the first region 251a and the second region 251b until the mobile terminal is converted from the open configuration (or, closed configuration) into the closed configuration (or, open configuration). For instance, it may be implemented in such a manner that in the open configuration of the mobile terminal, a range of an angle between the first region 251a and the second region 251b is divided into a first level (for instance, 180°~120°), a second level (for instance, 120°~90°), a third level (90°~60°), and a fourth level (60°~20°), and different screen may be displayed by each level.

As described above, according to the present invention, it is possible to provide information by a display method consistent with a user's desire, by implementing such that different screen information may be displayed according to a folded degree of a display unit based on a specific region.

Figure 8A:
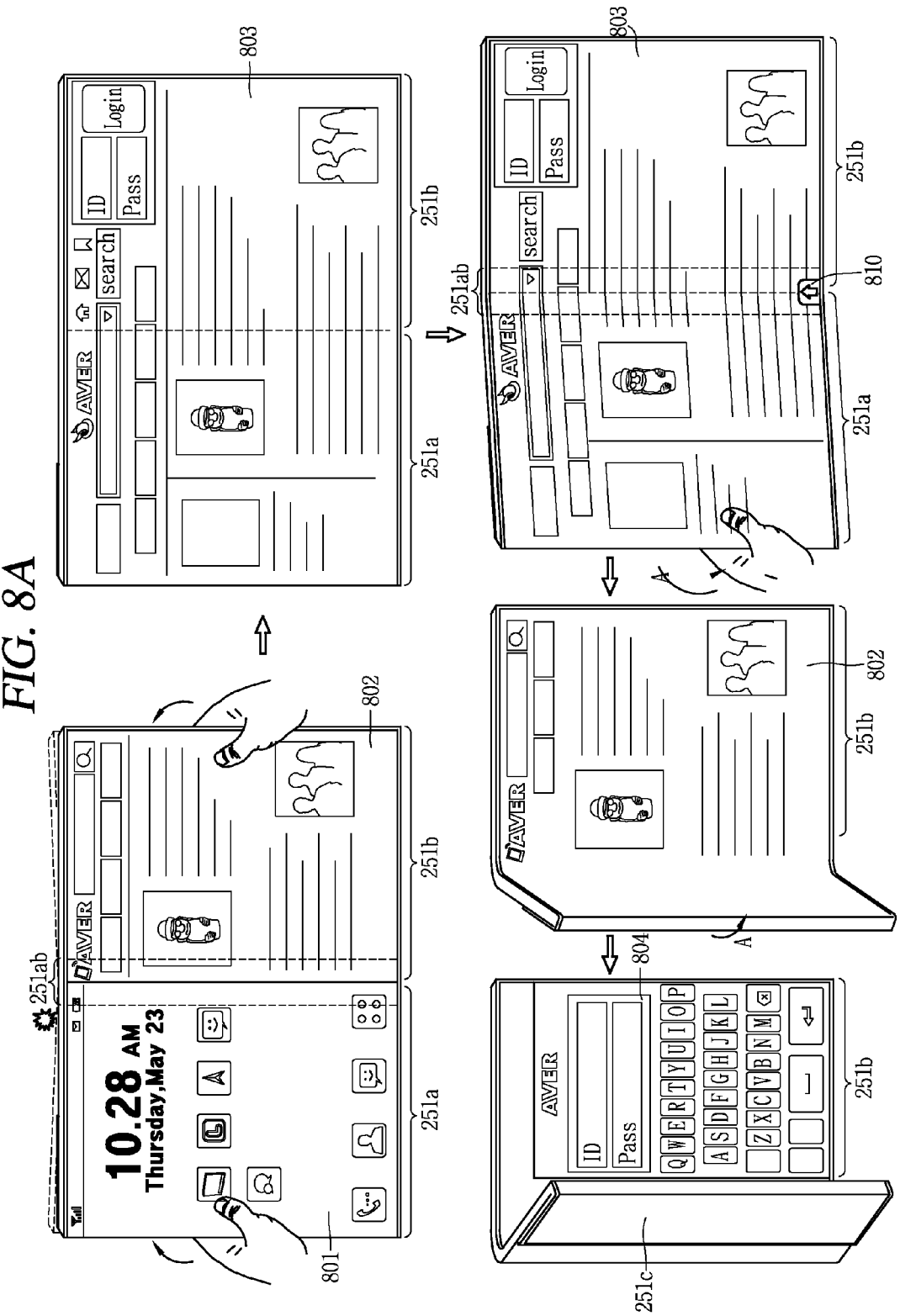
FIG. 8A is a view illustrating that different screen information is displayed according to a folded or unfolded degree of a display unit based on a specific region in a mobile terminal according to the present invention.

FIG. 8A is a view illustrating that different screen information is displayed according to a folded or unfolded degree of a display unit based on a specific region in the mobile terminal according to the present invention.

As shown in FIG. 8A, in the open configuration, different screen information may be displayed on the first and second regions 251a and 251b which are disposed within an inner surface of the mobile terminal. For instance, a home screen page (801) may be displayed on the first region 251a and an execution screen (802) of a web application may be displayed on the second region 251b.

Under the state, when the first and second regions 251a and 251b are folded backward based on a specific region 251ab as an external force is applied to the first and second regions 251a and 251b, the specific region 251ab may sense that a 'bending event' is generated.

Here, the 'bending event' means that in the open configuration, the first and/or second region 251a and/or 251b is further folded backward based on a hinge unit corresponding to the specific region 251ab, and when the 'bending event' is generated, it may be represented that the open configuration is converted into a 'bent configuration'. In the present invention, it may be stated that the open configuration is converted into the bent configuration when such a 'bending event' is generated. In the present invention, it may be limited to recognize only the case where the first and second regions 251a and 251b are simultaneously folded backward so that a currently displayed screen may not be unintentionally converted, as generation of a 'bending event'.

Further, the hinge unit corresponding to the specific region 251ab may include protrusions and hooking jaws to prevent the first and second regions 251a and 251b from being excessively folded backward, and an elastic member such as a spring may be further provided so that the mobile terminal may be elastically converted from the 'bent configuration' into the 'open configuration' when an external force applied to the first and second regions 251a and 251b is removed.

When a bending event is generated as above, as shown in FIG. 8A, an execution screen (802) of a web application which is displayed on the second region 251b is displayed on the entire part of the first and second regions 251a and 251b. In this case, the execution screen (802) displayed in the mobile terminal mode is converted into an execution screen (803) in the PC mode. Further, when an external force corresponding to the folding event is removed, the mobile terminal is elastically re-converted from the 'bent configuration' into the 'open configuration'.

Meanwhile, though not shown, in FIG. 8A, in a case where execution screens of different applications are displayed on the first region 251a and the second region 251b, respectively, an execution screen of a recently executed application may be displayed on the entire part of the first and second regions 251a and 251b when a bending event is generated on the specific region 251ab.

Further, though not shown, in another embodiment, when an external force applied to the first and second regions 251a and 251b to pull in a direction opposite to the specific region 251ab is sensed in a state that execution screens of different applications or plural execution screens in the mobile terminal mode are displayed on the first and second regions 251a and 251b, the execution screens being displayed on the first and second regions 251a and 251b may be converted into execution screens of the mobile terminal in the PC mode, while maintaining the open configuration of the mobile terminal. To this end, the specific region 251ab includes various sensors to distinctively sense external forces applied to the first and second regions 251a and 251b to pull in a direction opposite to the specific region 251ab or to push in a direction toward the specific region 251ab.

In such a state that the mobile terminal is open, as shown in FIG. 8A, when the first and second regions 251a and 251b are relatively rotated based on the specific region 251ab and it is sensed that a folding event is generated on the specific region 251ab, on one end of the specific region 251ab, for instance, on a lower end of the specific region 251ab, an image object (for instance, an arrow image) (810) for displaying a predetermined menu related to the execution screen (803) is displayed.

The controller 180 of the mobile terminal may determine as to whether a folded degree (folded angle) of the first and second regions 251a and 251b is less than a preset value when a folding event is generated on the specific region 251ab. Here, the preset value may be divided into plural steps, and in such a case, the controller 180 may differently control the displayed screen according to the steps corresponding to the folded degree of the first and second regions 251a and 251b.

Specifically, when at least one of the first region 251a and the second region 251b is further rotated to the front based on the specific region 251ab so that a folded degree (folded angle) of the first and second regions 251a and 251b is less than a first reference value (for instance, 180°~120°), as shown in FIG. 8A, in a state that an image object (810) is displayed on a lower end of the specific region 251ab, the display type of the execution screen (803) is converted into another display type.

For instance, the execution screen (803) in the PC mode displayed on the entire part of the first and second regions 251a and 251b is converted into an execution screen (802) in the mobile terminal mode. In this case, the execution screen (802) in the mobile terminal mode is displayed on a region where an exposed degree to the front is larger, that is, a display region where a relative rotation degree is smaller based on the specific region 251ab, for instance, on the second region 251b.

Meanwhile, in FIG. 8A, when at least one of the first region 251a and the second region 251b is further rotated to the front based on the specific region 251ab so that the folded level (folded angle) of the first and second regions 251a and 251b is less than a second reference value (for instance, 120°~90°) by being further folded than the first value, screen information composed of security-related information, for instance, a login information input screen (804) is displayed on the second region 251b in the execution screen (803) in the PC mode or an execution screen (802) in the mobile terminal mode. In this case, the first region 251a may be converted into an inactivated state.

The controller 180 may determine differently a size of the login information input screen (804) according to a covered degree of the second region 251b by the first region 251a. For instance, when a folded angle of the first and second regions 251a and 251b is changed from 60° to 80°, a size of the login information input screen (804) may be increased according to the changed angle.

When a mobile terminal is converted into the open configuration after login information is input to the displayed login information input screen (804), login is executed. And on the second region 251b, logged-in screen information is displayed in the mobile terminal mode. In this case, the first region 251a is maintained in an inactivated state, or other screen information, such as a home screen page, may be displayed, as shown in FIG. 8A.

In another embodiment, the controller 180 may convert displayed screen into another screen or a screen requiring security under the condition that a state where a folded degree of the first and second regions 251a and 251b is less than a reference value is maintained for a predetermined time (for instance, 2 seconds).

Alternatively, the controller 180 may convert the displayed screen into another screen or a screen requiring security under the condition that a folded degree of the first and second regions 251a and 251b is less than a preset reference value and a touch input applied to a region where a relative rotation degree is larger between the first region 251a and the second region 251b is maintained for a predetermined time.

Accordingly, it is possible to solve the problem in that currently displayed screen is converted into another screen even in a case where the mobile terminal is unintentionally folded or a user intentionally folds the unfolded mobile terminal.

FIG. 8B is an exemplary schematic view illustrating that a displayed screen is converted into another screen using a preset touch input applied to a specific region in a state that the mobile terminal is folded according to the present invention.

Referring to FIG. 8B, in the open configuration, the controller 180 may sense that a preset touch input, for instance, a swipe input to press down is applied to the specific region 251ab within a reference time in a state that, for instance, an execution screen (803) of a web application in the PC mode is displayed on the entire part of the first and second regions 251a and 251b, and the first and second regions 251a and 251b are relatively rotated based on the specific region 251ab in a direction "A" so as to be folded at a predetermined angle (for instance, 120°~90°).

Thereafter, the controller 180 may execute a preset second application, and then convert the execution screen (803) into an execution screen corresponding to the second application.

Here, the second application may be an application which satisfies a specific condition (for instance, an application requiring security, or an application frequently used by a user), or an application which is preset through a user input. For instance, as shown in FIG. 8B, an execution screen (805) of a preset finance application may be displayed on the second region 251*b*.

Under such a state, when the first and second regions 251*a* and 251*b* are further folded based on the specific region 251*ab* in a direction "A", the execution screen (805) of the finance application is converted into an input screen (806) for inputting security-related login information. In this case, a size of the input screen (806) is determined based on a covered degree of the second region 251*b* as the first region 251*a* is rotated, and for instance, as shown in FIG. 8B, the input screen (806) may be displayed on part of the second region 251*b*.

Meanwhile, the controller 180 may control the input screen (806) to be disposed on the first region 251*a* by relatively rotating the second region 251*b* in a state that a touch input is applied to the second region 251*b*, even in a case where the execution screen (805) of the finance application is displayed on the second region 251*b*. Thus, it is possible to input information requiring security without exposing to others even in a case where others are positioned to the right based on a user.

In FIG. 8B, when the first and second regions 251*a* and 251*b* are rotated in a direction "B" based on the specific region 251*ab* after login information is input so as to be converted into the open configuration, as shown in FIG. 8B plural execution screens (807 and 808) of a finance application to which a login is executed (that is, security is released) are displayed on the first and second regions 251*a* and 251*b*, respectively. Here, a display type of the plural execution screens (807 and 808) may be the mobile terminal mode. In such a case, when a folding event is generated on the specific region 251*ab*, the plural execution screens (807 and 808) are converted into a single execution screen in the PC mode.

Meanwhile, after login information is input in FIG. 8B, when the first and second regions 251*a* and 251*b* are further rotated in a direction "A" so that the mobile terminal is converted into the closed configuration, as shown in FIG. 8B, information (820) informing that a login is executed to the second display region 251*c* (refer to FIG. 2D) disposed on an outer surface of a terminal is displayed. In this case, the information (820) may be displayed in a manner to be overlapped with the execution screen (807) of the finance application to which a login is executed (that is, security is released).

According to the embodiment as described above, it is possible to promptly access to a specific application using a touch input applied to a specific region in a state that the mobile terminal is folded or unfolded, and to input information requiring security without exposing to others.

Hereinbefore, described in detail exemplary embodiments in that different screen information is displayed according to a folded degree of the mobile terminal in the open configuration.

Hereinafter, will be described in detail, with reference to FIG. 9, exemplary embodiments in which different information is displayed on an inner display region according to an unfolded degree of the mobile terminal in the 'closed configuration'.

Figure 9:
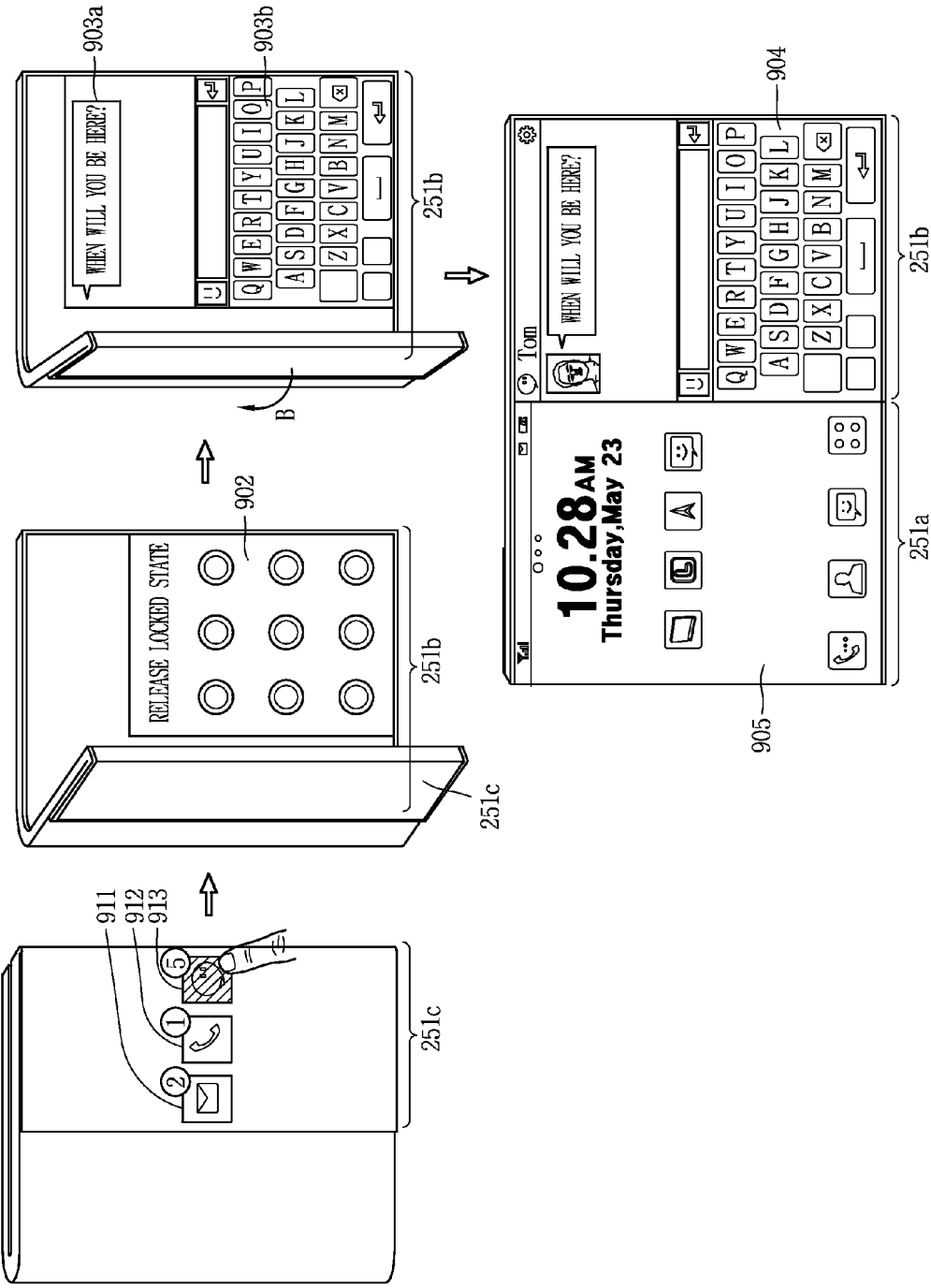
FIG. 9 is an exemplary view illustrating that information related to an event is differently displayed according to an unfolded degree of a mobile terminal when an event is generated in an open state of the mobile terminal according to the present invention.

When an event is generated in the closed configuration, as shown in FIG. 9, icons (911, 912 and 913) informing generation of an event are displayed on an outer display region 251*c*. Here, the event means that an occurrence which may affect an influence on an operation of at least one application installed in the mobile terminal is generated, an occurrence to change an item of database (or data file) related to the at least one application is generated, or an occurrence to send or transmit data to an external terminal or an external network through the at least one application. For instance, a 'call reception' or a 'message reception' may be an example of the event.

Next, the controller 180 may sense that an opening event is generated in a state that a touch input (for instance, a long touch input) is applied to one (913) of the icons (911, 912 and 913). Here, the opening event means that an external force is applied to the mobile terminal to release the 'closed configuration' of the mobile terminal.

When an opening event is generated, as shown in FIG. 9, an input screen (for instance, a pattern input screen) (902) for converting a locked state into a released state may be displayed on the first region 251*a* and/or the second region 251*b* which are disposed within an inner surface. Meanwhile, though not shown, it may be embodied in such a manner that an input screen (902) which is the same as or similar to that as shown in FIG. 9, is displayed on an outer display region 251*c* or a side extension display region 251*d* (refer to FIG. 2E). In such a case, the example of FIG. 9 may be omitted.

When an unfolded degree of a mobile terminal corresponding to the opening event is within a preset reference value, the controller 180 may convert one of the first region 251*a* and the second region 251*b* disposed within an inner surface of a mobile terminal into an activated state (in this case, in case of undergoing the process as shown in FIG. 9, the above process is executed in FIG. 9), and display information (903) related to the above-mentioned event on part of the region which has been converted into an activated state.

Here, the information related to the event means notification information indicating visually an event which is generated on at least one application. For instance, a received message, other party's contact information, and a message receipt time may be an example of the information related to the event.

In this case, when a type of unfolding the mobile terminal corresponding to the opening event is a first open type in which the first region 251*a* is unfolded so as to be laid on a front surface, information (903) related to the event is displayed on the first region 251*a*, and while a type of unfolding the mobile terminal corresponding to the opening event is a second type in which the second region 251*b* is unfolded so as to be laid on the front surface, information (903) related to the event is displayed on the second region 251*b*. Meanwhile, when a type of unfolding the mobile terminal is a third open type in which both the first and second regions 251*a* and 251*b* are unfolded so as to be laid on the front surface, information (903) related to the event is displayed on the entire part of the first and second regions 251*a* and 251*b*.

Meanwhile, when an opening event is generated, the controller 180 may determine differently an unfolded degree of the mobile terminal according to a relative-rotation of the first and second regions 251*a* and 251*b* based on the specific region 251*ab*. Further, the controller 180 may control a display range or the amount of the information (903) related to the event, according to an unfolded degree of the mobile terminal.

For instance, when the first and second regions 251*a* and 251*b* are relatively rotated to a rear side based on the specific region 251*ab* so that an unfolded degree of the mobile terminal is within a first reference value (for instance, 20°~60°), the controller 180 may display only a message received at part of the second region 251*b*, and while the first and second regions 251*a* and 251*b* are further rotated to a rear side so that an unfolded degree of the mobile terminal is within a second reference value (for instance, 60°~90°) which exceeds the first reference range, the controller 180 may display a received message (903*a*) and an input region (903*b*) for drafting a response message on the second region 251*b*.

Meanwhile, when an unfolded degree of the mobile terminal exceeds a preset reference value, that is, a third reference value (for instance, 90°) so that the mobile terminal is converted into an open configuration, as shown in FIG. 9, the inner display regions are entirely activated. Thereafter, the controller 180 may display an execution screen (904) of an application corresponding to an icon which is selected in FIG. 9, on the first region 251*a* and screen information different from the execution screen (904), for instance, a home screen page on the second region 251*b*.

In this case, when the first and second regions 251*a* and 251*b* are folded to the front side based on the specific region 251*ab* at a predetermined angle, the execution screen (904) is converted into a related other screen or an image object for displaying a predetermined menu is popped up on one end of the specific region 251*ab*. Meanwhile, when the first and second regions 251*a* and 251*b* are folded to a rear side based on the specific region 251*ab*, the execution screen (904) displayed in the mobile terminal mode is converted into the PC mode and displayed on the entire part of the first and second regions 251*a* and 251*b* in the mobile terminal screen.

Meanwhile, in the open configuration, when the first and second regions 251*a* and 251*b* are relatively rotated based on the specific region 251*ab* and folded more than a reference value, an input region for drafting a message is displayed on a dialogue screen in an overlapped manner so that sent and received messages and drafted messages can not be exposed to the front side.

According to the embodiment of the present invention, in a case where an event is generated in the closed configuration, it is possible to check content of the event by unfolding a little the mobile terminal without exposing the content to others, or check content of the event on a large screen by unfolding completely the mobile terminal.

Figure 10:
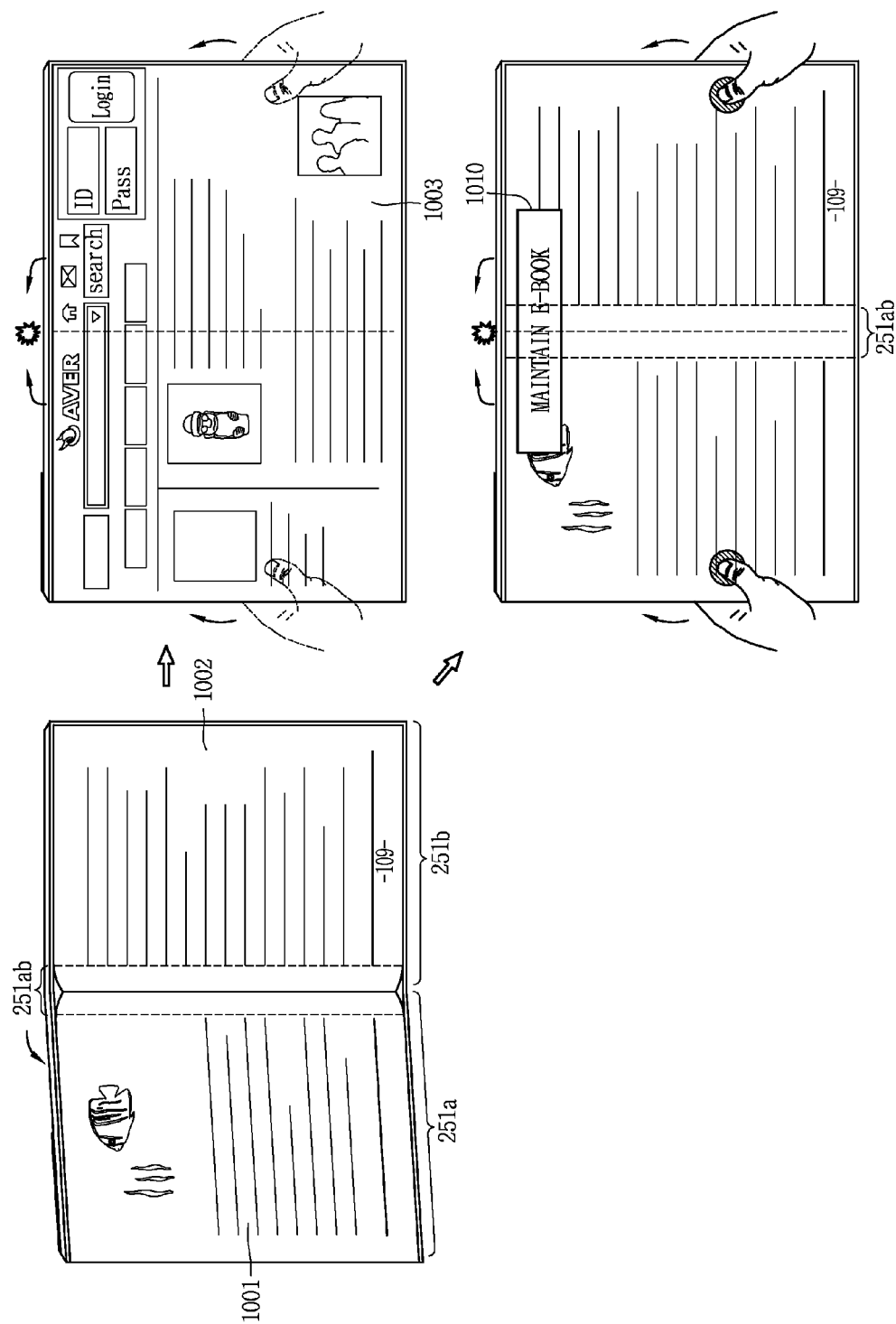
FIG. 10 is an exemplary view illustrating that different applications are executed as a mobile terminal is converted into a bent state based on a specific region, from an open state according to the present invention.

FIG. 10 is an exemplary view illustrating that different applications are executed as a mobile terminal is converted into a 'bent state' based on a specific region from an unfolding state according to the present invention.

As shown in FIG. 10, in the open configuration, when the first region 251*a* and/or the second region 251*b* which are disposed within an inner surface are bent slightly forward based on the specific region 251*ab*, the first screen information may be converted into an application which is appropriate to screen division, for instance, plural pages (1001 and 1002) corresponding to execution of an e-book application and displayed on the first region 251*a* and the second region 251*b*, respectively.

In this case, the controller 180 may limit such that a screen conversion may be performed only in a case where a preset condition (for instance, bent in a case where a touch is applied to a specific spot of the first and second regions 251*a* and 251*b*) is satisfied, as a result a screen conversion does not occur when the first region 251*a* and/or the second region 251*b* is unintentionally folded forward.

Thereafter, when a 'bending event' in which the first region 251*a* and/or the second region 251*b* is bent backward is generated, as shown in FIG. 10, plural pages (1001 and 1002) corresponding to execution of an e-book application are converted into an execution screen of a preset application which is appropriate to a large screen, for instance, an execution screen (1003) of a web application in the PC mode. In this case, when an external force corresponding to the bending event is released, the bent state of the mobile terminal is automatically converted into the open configuration.

Under the state, when the first region 251*a* and/or the second region 251*b* is further bent forward based on the specific region 251*ab* a little more, the controller 180 may convert the execution screen (1003) of a web application in the PC mode into screen information previously displayed or an execution screen of an application which is appropriate to a screen division.

Meanwhile, it may be implemented such that a display state of plural pages (1001 and 1002) corresponding to execution of an e-book application may be maintained even in a case where a 'bending event' in which the first and second regions 251*a* and 251*b* are bent backward based on the specific region 251*ab*, as shown in FIG. 10. To this end, the controller 180 may control such that a pre-displayed screen can be maintained even when a bending event is generated on the specific region 251*ab* in a case where a preset condition is satisfied. For instance, in a case where a touch input applied to the first and second regions 251*a* and 251*b* corresponding to the bending event is maintained for more than a preset pressure and time, or in a case where a touch input successive to the previously input touch input is applied (for instance, a short-double touch input), the controller 180 may maintain continuously a display state of plural pages (1001 and 1002) corresponding to execution of an e-book application even though a bending event is generated on the specific region 251*ab*. In this case, as shown in FIG. 10, a notification icon informing maintenance of the screen (for instance, a message such as 'e-book is maintained') may be popped up on the inner display regions 251*a* and 251*b*.

Further, though not shown, when a bending event is re-generated in a state where plural pages (1001 and 1002) corresponding to execution of an e-book application are converted into an execution screen (1003) of a web application according to generation of a bending event, the current screen may be converted into another application, for instance, a frequently executed application or an execution screen of another application which is being currently executed.

Figure 11B:
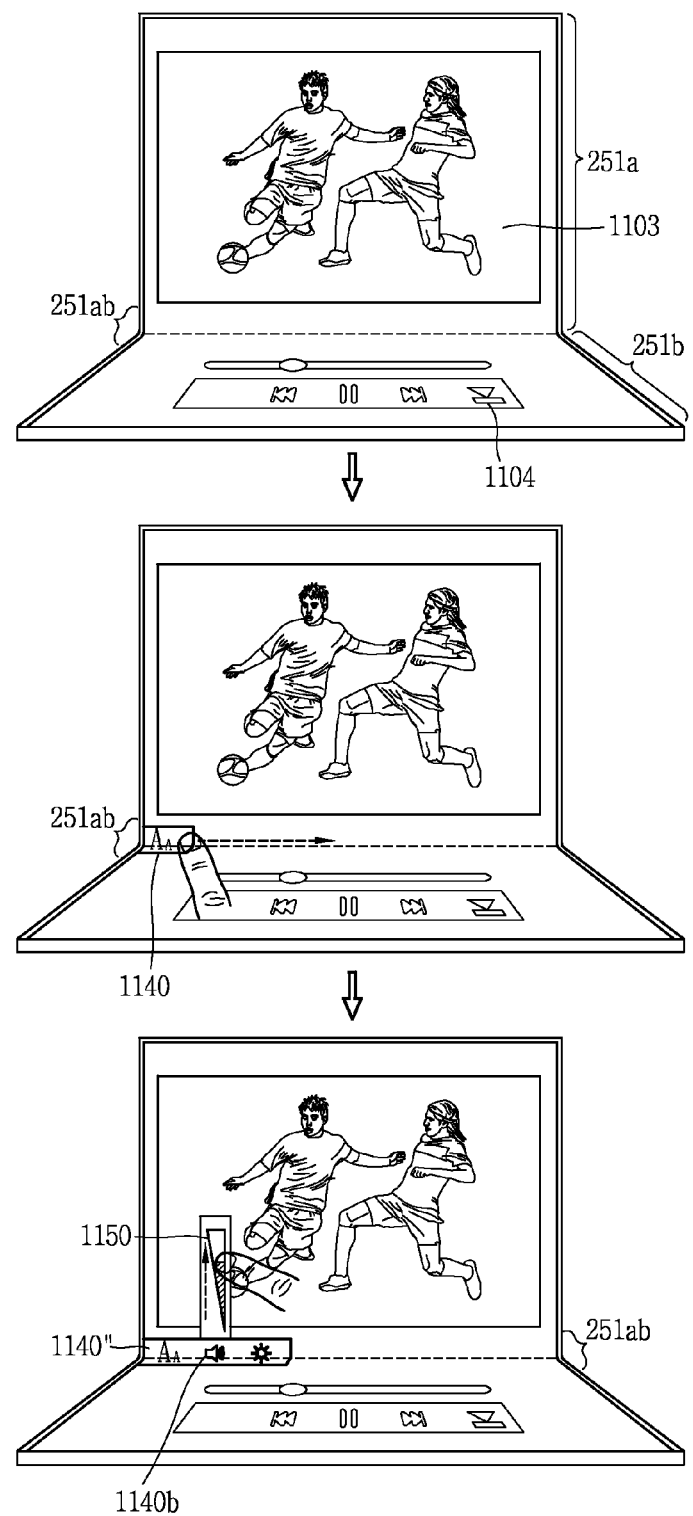
Figure 11C:
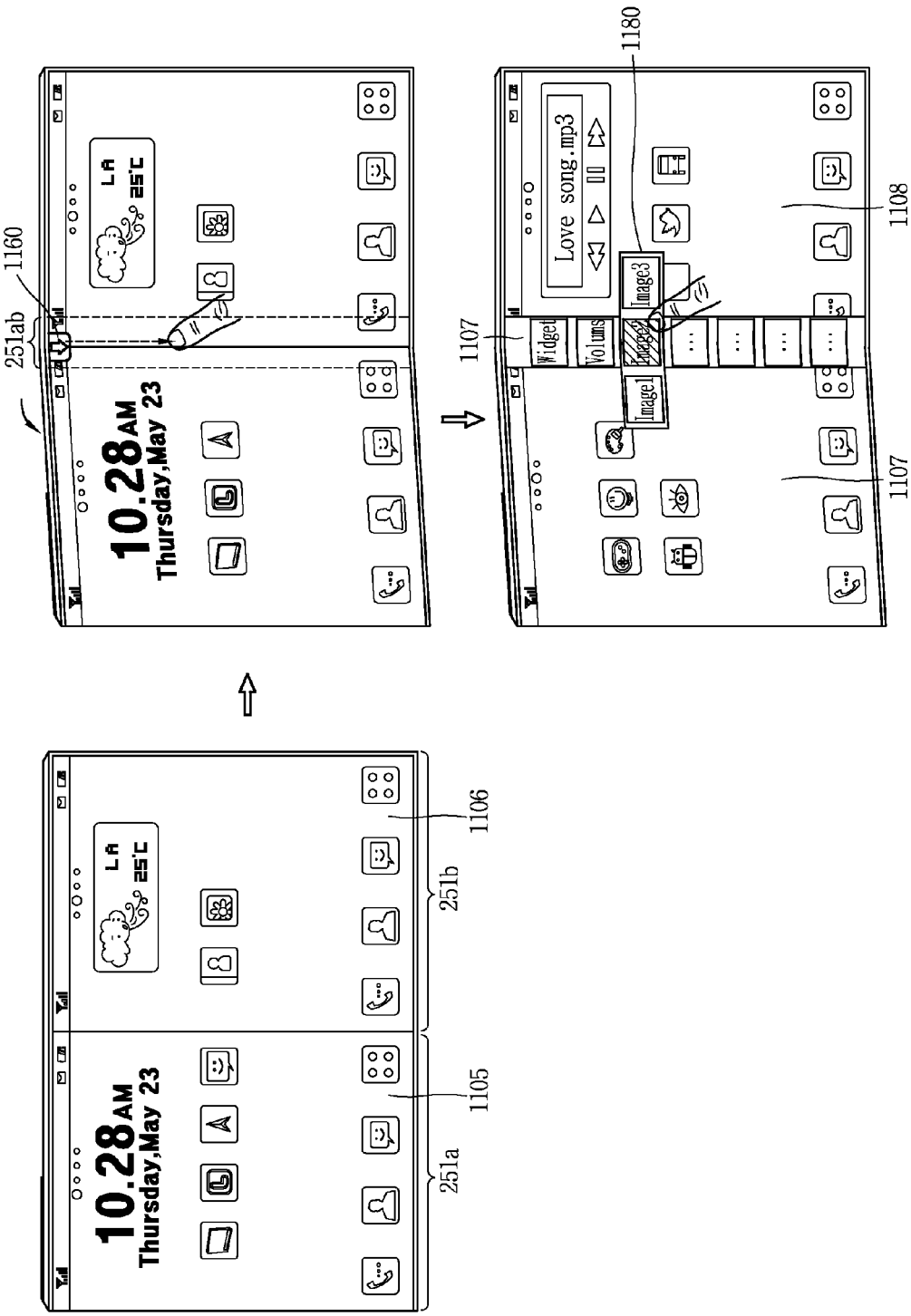

FIGS. 11A through 11C are exemplary views illustrating a method to change a display setting using a touch input applied to a specific region, in a state that the mobile terminal is folded at a predetermined angle according to the present invention.

Referring first to FIG. 11A, in a state that an execution screen of at least one application, for instance, plural pages (1101 and 1102) corresponding to execution of an e-book application are displayed on the inner display regions, i.e., the first and second display regions 251*a* and 251*b*, in the open configuration, the controller 180 may sense that generation of a 'folding event' in which the first and second regions 251*a* and 251*b* are folded forward based on the specific region 251*ab* at a predetermined angle.

When a folding event is generated as above, an image object (1110) for changing a display setting of the displayed plural pages (1101 and 1102) on one end, for instance, on an upper end of the specific region 251*ab*, as shown in FIG. 11A.

Here, the image object may be an image having a predetermined length and thickness and configured to guide an input type of a control command for displaying a predetermined menu on the specific region 251ab. For instance, the image object may be a swipe input to sweep down the specific region 251ab, as shown in FIG. 11A, a flicking input, or an arrow image including direction information inducing a drag input. Meanwhile, when a predetermined time elapses without executing any input operation in a state that the image object (1110) is displayed, the image object (1110) may disappear to dissolve a screen covering state. In this case, when a folded degree corresponding to the folding event is maintained and a preset touch (for instance, a short touch input or a double-short touch input) is applied to the specific region 251ab, the image object (1110) which has disappeared may be re-output to the specific region 251ab. Further, the image object (1110) may be changed into another image and displayed, according to screen information displayed on the first and second regions 251a and 251b. For instance, in a case where a background color of the screen information displayed on the first and second regions 251a and 251b is dark, the image object may be displayed in a bright color, and while in case where a background color of the screen information displayed on the first and second regions 251a and 251b is bright, the image object may be displayed in a dark color so as to be distinguished from the background of the screen information. Alternatively, the image object may be displayed in a state having a predetermined transparency in order to minimize covering of the screen.

When a drag input (or a swipe input) performed from one end (for instance, an upper end) to the other end (for instance, a lower end) of the specific region 251ab is applied to the image object, the controller 180 may output an icon list (1120) for changing a display setting of screen information displayed on the first and second regions 251a and 251b along a route of the drag input. The icon list may include plural icon images for changing a display setting.

In this case, a length of the icon list corresponds to a length of the drag input applied to the image object, and a width of the icon list corresponds to a width of the specific region 251ab. Further, in a case where the drag input applied to the image object is dragged to the other end of the specific region 251ab and then released, the icon list may be fixed to the specific region 251ab.

Further, a type of the icons included in the icon list may be altered depending upon a type of the screen information displayed on the first and second regions 251a and 251b.

For instance, as shown in FIG. 11A, when plural pages (1101 and 1102) corresponding to execution of an e-book application are displayed on the first and second regions 251a and 251b, an icon list (1120) may include a first icon (1120a) for changing a size of a text displayed on the plural pages (1101 and 1102), a second icon for executing Text To Speech (TTS) function, and a third icon for changing a brightness of the screen.

Next, when a touch, applied to a specific icon (1120c) for changing a setting value in an icon list (1120) which has been displayed on the specific region 251ab, is dragged to the left or right, a setting value corresponding to the selected specific icon (1120c) is changed and applied to the displayed screen information. In this case, as the touch applied to the specific icon (1120c) is dragged in the left or right direction, a graphic object (for instance, OSD window) (1130) indicating a corresponding setting value may be displayed on the first and second regions 251a and 251b. Here, the graphic object may be an image having a variable length which disappears after a while upon being real time displayed along a drag route of the touch.

For instance, as shown in FIG. 11A, when a touch applied to a third icon (1120c) for changing a brightness of a screen in the displayed icon list (1120), a screen of the plural pages (1101 and 1102) is changed to be dark.

Meanwhile, the displayed graphic object (1130) and/or the icon list (1120) may disappear when a predetermined time lapses, a touch applied to the icon list (1120) is upwardly dragged, a touch is applied to one of the first region 251a and the second region 251b, or the first and second regions 251a and 251b are bent backward based on the specific region 251ab so that the mobile terminal is converted into the open configuration.

According to the present invention, as shown in FIG. 11B, the mobile terminal may be used in a state that one of the first region 251 and the second region 251b is laid on a floor and the other is erected to be vertical to the floor in a state that the mobile terminal is folded based on the specific region 251ab. Hereinafter, such a state will be referred to as a 'horizontal view state'.

Referring to FIG. 11B, in the 'horizontal view state' of the terminal, a video screen (1103) corresponding to execution of a video application may be displayed on the first region 251a which is erected so as to be vertical to the floor, and a control bar (1104) for controlling an operation of the video screen (1103) may be displayed on the second region 251b which is laid on the floor.

In this case, when a drag input is applied toward the other end (for instance, a right end) of the specific region 251ab, as shown in FIG. 11B, in a state where a touch is applied to one end (for instance, a left end) of the specific region 251ab which supports the horizontal view state of the mobile terminal, an icon list (1140) for changing a display state of the video screen (1103) is gradually displayed along a route of the drag. When a touch applied to a specific icon (1140b), for instance, an icon for controlling a volume in a state where the icon list (1140) is fixed (1140") is dragged to the first region 251a or the second region 251b, a volume of the video screen (1103) is adjusted according to a dragged degree or direction, and a graphic object (for instance, an OSD window) indicating a corresponding value may be displayed.

Referring to FIG. 11C, when the first and second regions 251a and 251b are folded forward at a predetermined angle in a state where plural home screen pages (1105 and 1106) are displayed on the first and second regions 251a and 251b, respectively, the mobile terminal may enter an editing mode to reconstruct the home screen pages by dragging downward an image object (1106) which is popped up on an end of the specific region 251ab.

Once the mobile terminal enters the editing mode for reconstructing the home screen pages, a menu list (1170) for changing a display state of the home screen page is displayed on the specific region 251ab. For instance, when a menu (1170c) for changing a background image of the home screen pages is selected from the menu list (1170), a thumbnail list (1180) of changeable other background image is displayed in a longitudinal direction parallel to the selected menu (1170c). The changed background image is temporarily applied to at least one of the home screen pages (1105 and 1106) each time when a touch is sensed at a thumbnail in the displayed thumbnail list (1180). When a touch is released at a specific thumbnail, the editing mode is released, and the background image of the home screen pages (1105 and 1106) may be changed to a background image corresponding to the specific thumbnail.

Figure 12A:
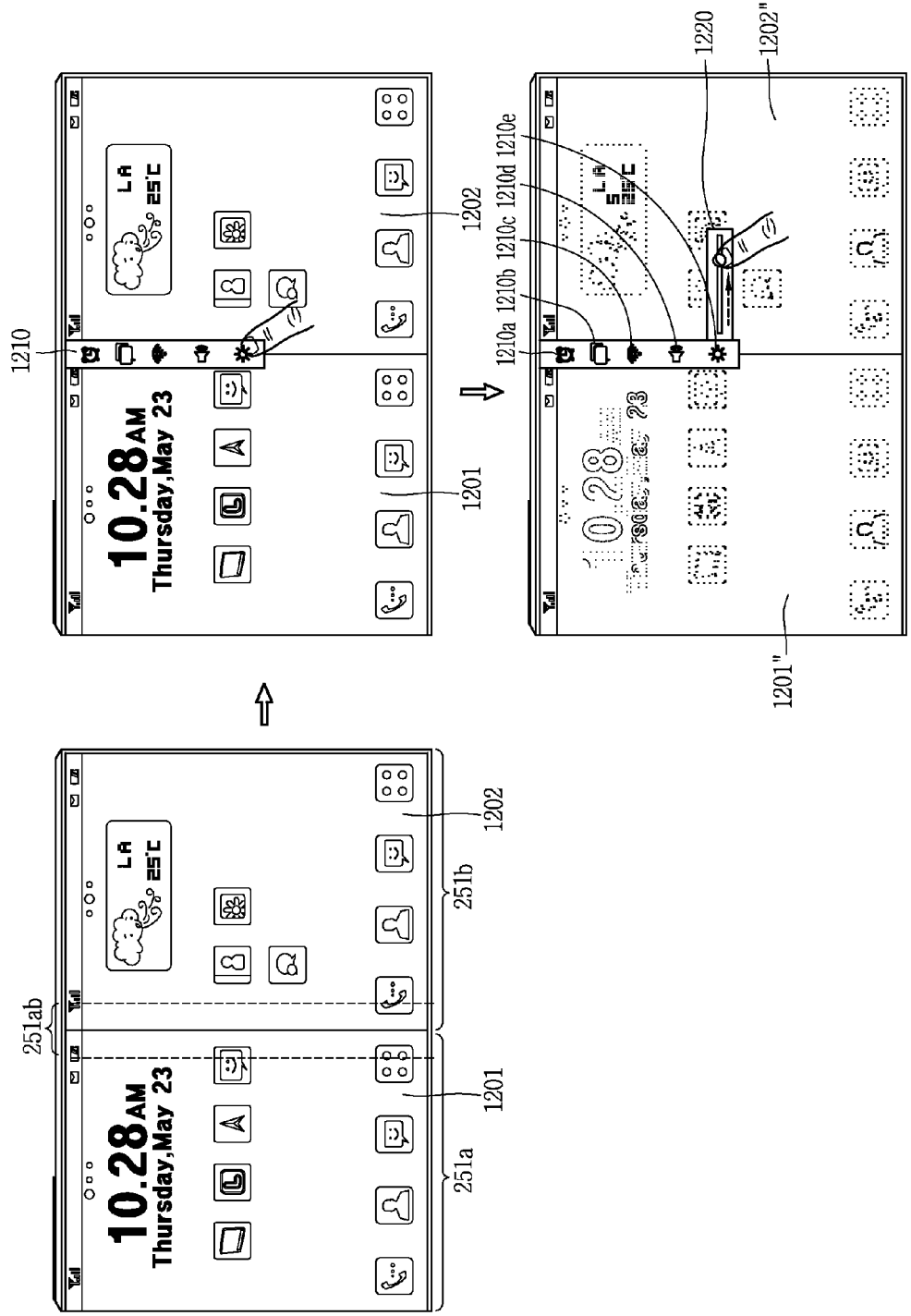
FIGS. 12A, 12B and 12C are exemplary views illustrating a method to change an operation state of a mobile terminal using a touch input applied to a specific region, in a state that a mobile terminal is in an open state according to the present invention.
Figure 12B:
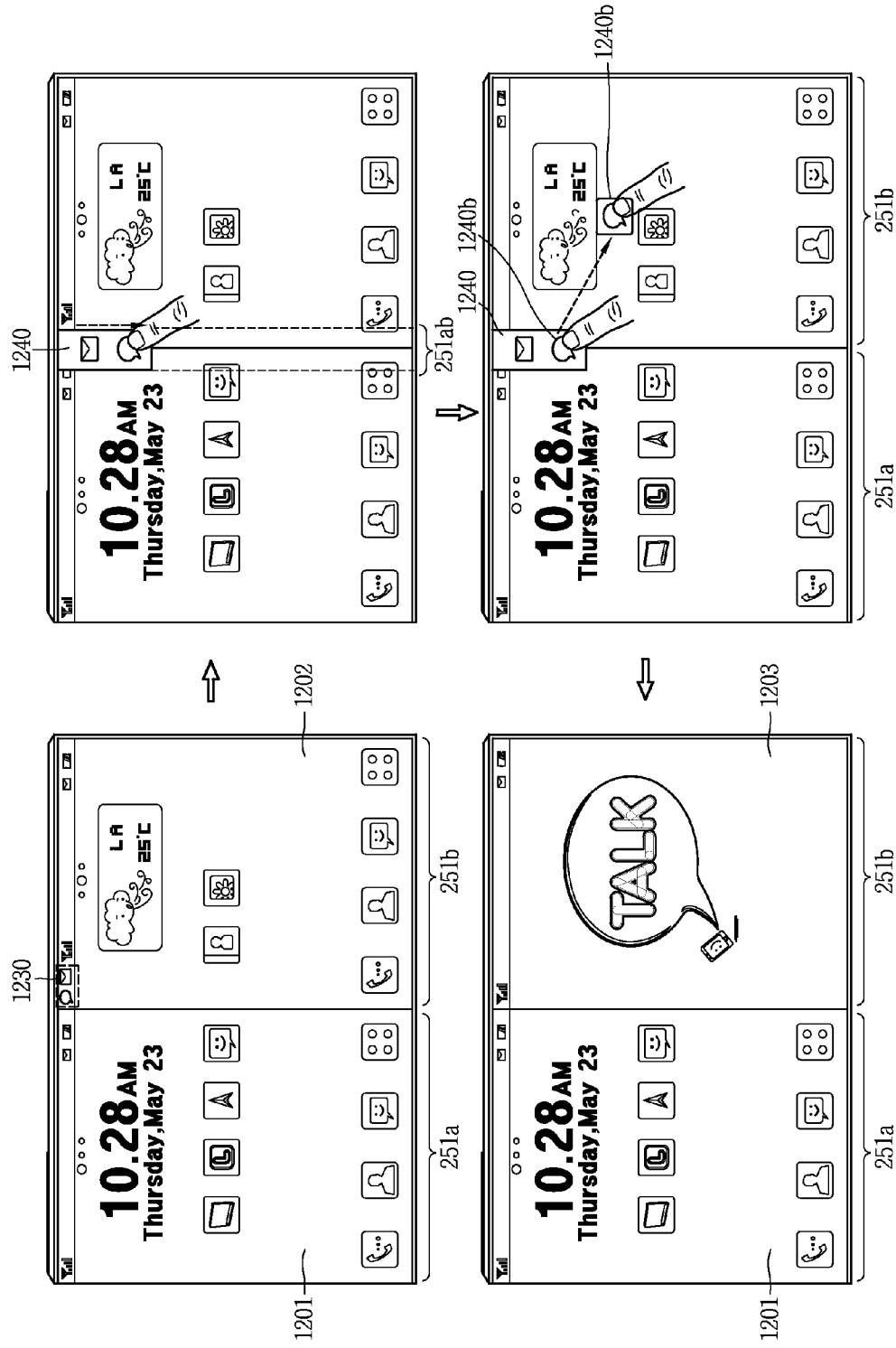
Figure 12C:
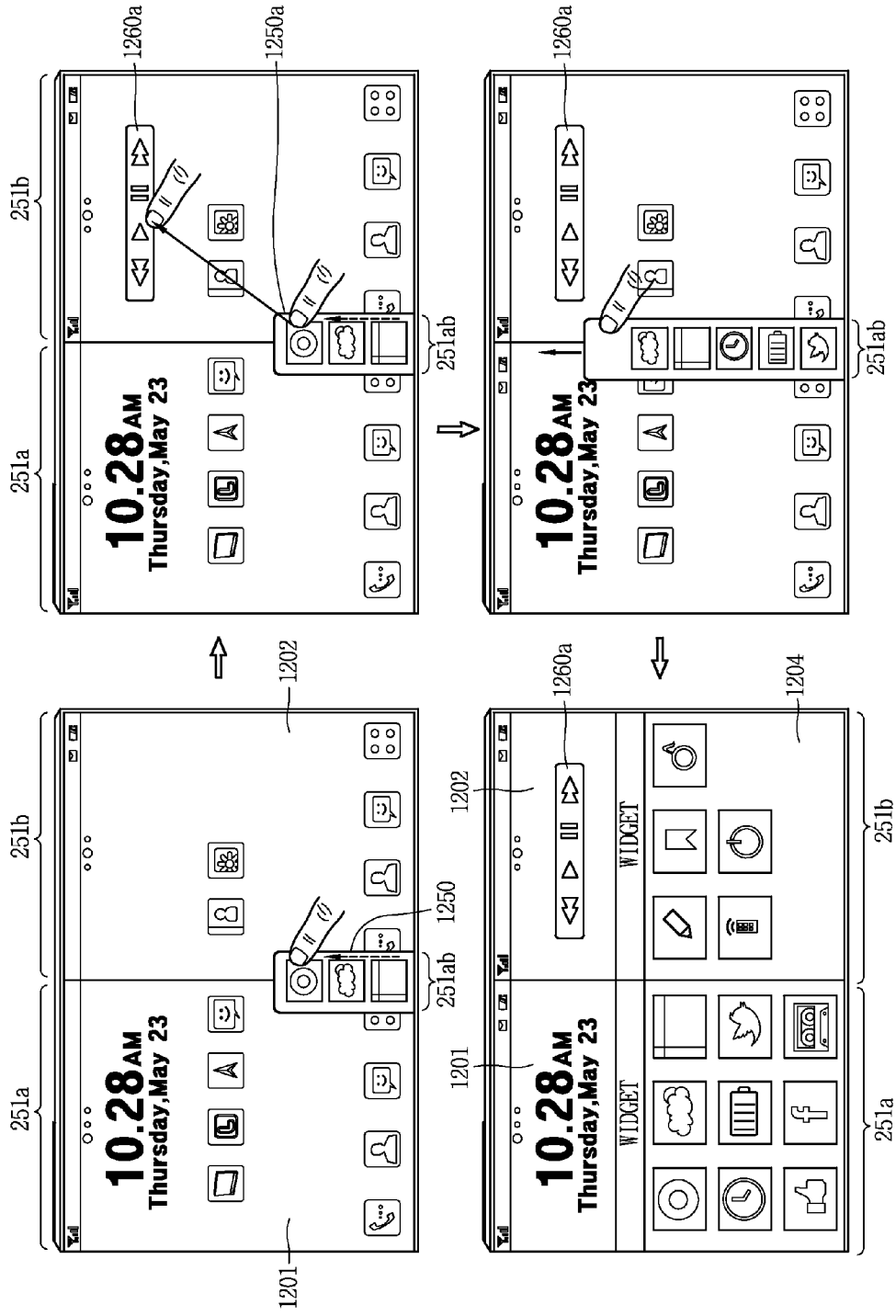

FIGS. 12A through 12C are exemplary views illustrating a method to change an operation state in the mobile terminal using a touch input applied to a specific region, in a state that the mobile terminal is in an open (unfold) state, according to the present invention. Here, it is not necessary to convert an open configuration into a closed (folded) configuration of the mobile terminal in order to display a menu list for changing an operation state of the mobile terminal.

Referring to FIG. 12A, in the open configuration, when plural home screen pages (1201 and 1202) are displayed on the first and second regions 251a and 251b, and a preset touch input, for instance, a swipe input performed from an upper to a lower direction, a drag input, or a flicking touch input is applied to the specific region 251ab, as shown in FIG. 12A, a preset setting icon list (1210) is displayed along a drag route of the touch input. Here, the icons included in the setting icon list (1210) may correspond to a quick setting menu. For instance, the setting icon list (1210) may include a menu (1210a) for setting alarm, a menu (1210b) for setting a power saving mode, a menu (1210c) for setting Wi-Fi, a menu (1210d) for setting sound, a menu (1210e) for controlling brightness, and various setting menus for changing an operation state of the mobile terminal, such as Bluetooth, NFC, and an aircraft mode.

The controller 180 may fix the setting icon list (1210) to the specific region 251ab when a dragged degree of the touch input exceeds a reference range. When a touch is applied to a setting menu desired to be changed in the fixed setting icon list (1210), the corresponding function is reset to ON/OFF.

Meanwhile, as shown in FIG. 12A, when a menu (1210e) for controlling a brightness including various setting values is selected, it is possible to control a brightness by dragging a touch applied to the menu (1210e) to the left or right. In this case, as the touch applied to the menu (1201e) is dragged to the left or right, a graphic object (for instance, an OSD window) (1220) indicating a setting value may be displayed in a horizontal direction. Thus, changed brightness value may be applied (1201" and 1202") to a plurality of displayed home screen pages (1201 and 1202).

In another embodiment, it is possible to change a corresponding setting value by folding or unfolding the mobile terminal based on the specific region 251ab, in a state that a specific menu including various setting values in a setting icon list (1210) is selected. Under the state, when a folded degree of the mobile terminal corresponding to a desired setting value is maintained for a predetermined time, a state of the mobile terminal is changed to have the corresponding setting value, and the setting icon list (1210) which has been displayed on the specific region 251ab disappears. Thereafter, the mobile terminal may be operated with the changed setting value although it is converted into the open configuration.

FIG. 12B shows that an application corresponding to an event is quickly executed using a touch input applied to the specific region 251ab, when an event is generated in a state that the mobile terminal is open (unfolded).

As shown in FIG. 12B, in a state that the mobile terminal is open, when an event is generated in at least one application, a notification icon (1230) informing generation of an event is displayed on a display region disposed within an inner surface, i.e., at an upper end of the first region 251a or the second region 251b.

Under the state, when a drag input, for instance, a drag input performed from an upper end to a lower end of the specific region 251ab is applied to the specific region 251ab, as shown in FIG. 12B, an icon image (1240) a size of which is gradually changed along a route of the drag input, is displayed on the specific region 251ab. In this case, the icon image (1240) may include information indicating an application in which an event is generated and information indicating the number of generated event.

In this case, in case of checking or processing the event, when a touch applied to a desired icon in the icon image (1240), for instance, a touch applied to an icon (1240b) of a message application is dragged to one of the first region 251a or the second region 251b, as shown in FIG. 12, the icon (1204b) is moved to the second region 251b along a route of the drag. Under the state, when the touch is released, the controller 180 executes an application corresponding to the icon (1240b) in the second region 251b.

Thereafter, the icon image (1240) which has been displayed on the specific region 251ab disappears, and an execution screen of an application corresponding to the selected icon (1240b) is displayed on the second region 251b. In this case, the screen information which has been displayed on the first region 251a is maintained as it is, and only a notification icon (1230") of an unidentified event remains on an upper end of the second region 251b.

FIG. 12C is a view illustrating an embodiment to add or rearrange an object such as an icon and a widget of an application to a home screen page using a touch input applied to the specific region 251ab.

As shown in FIG. 12C, in the open configuration, when a touch starting from another end (for instance, a lower end) of the specific region 251ab is dragged in a preset direction (for instance, an upper end of the specific region 251ab), the controller 180 may output an icon list (1250) related to an application which is preset to the specific region 251ab along a route of the drag.

Here, the icon list (1250) includes an icon and widget of an application which is not displayed on the first and second regions 251a and 251b among applications preset in the mobile terminal. In this case, the controller 180 may control the icon and widget of an application included in the icon list 1250 to be output in the order of priority (for instance, an order of recently installed).

As the touch applied to the icon list (1250) is dragged, a length of the icon list (1250) is gradually increased. Meanwhile, when an icon or widget desired to be disposed at the first or second region 251a or 251b is output to the icon list (1250), as shown in FIG. 12C, the controller 180 may dispose a voice source widget (1260a) corresponding to the widget icon (1250a) at a spot where the drag is released, when a touch applied to a desired widget icon (1250a) is dragged to the first or second region 251a or 251b.

Meanwhile, when a touch applied to the icon list (1250) is dragged up to an end of one end (for instance, an upper end) of the specific region 251ab, the icon list (1250) disappears and a widget panel (1204) is displayed on part of the first and second regions 251a and 251b. In this case, the widget panel (1204) is displayed in a manner to be overlapped with the home screen pages (1201 and 1202) which have been displayed on the first and second regions 251a and 251b. When a desired widget icon in the widget panel (1204) is moved to the first or second region 251a or 251b where the home screen pages (1201 and 1202) are displayed, the controller 180 disposes the moved widget icon within a region where the touch is released. The displayed widget panel (1204) may be configured to disappear when a bent event, a touch event, or a folding event is generated.

Further, though not shown, in the open configuration, in a case where an execution screen of a first application is displayed on the first and second regions 251a and 251b, the controller 180 may output an image object for executing a second application which is different from the first application to another end (for instance, a lower end) of the specific region 251*ab* when a touch event is sensed on the specific region 251*ab*. Here, the image object is an image having a predetermined length and width, and may be an image different from the image object which is displayed on one end (for instance, an upper end) of the specific region 251*ab*.

Under the state, when a drag input performed from another end to one end of the specific region 251*ab* is applied to the image object or the specific region 251*ab*, an icon list corresponding to the second application may be displayed on the specific region 251*ab* along a route of the drag input. In this case, when one of icons is selected from the icon list, the controller 180 may convert an execution screen of the first application into an execution screen of an application corresponding to the selected icon.

Figure 13A:
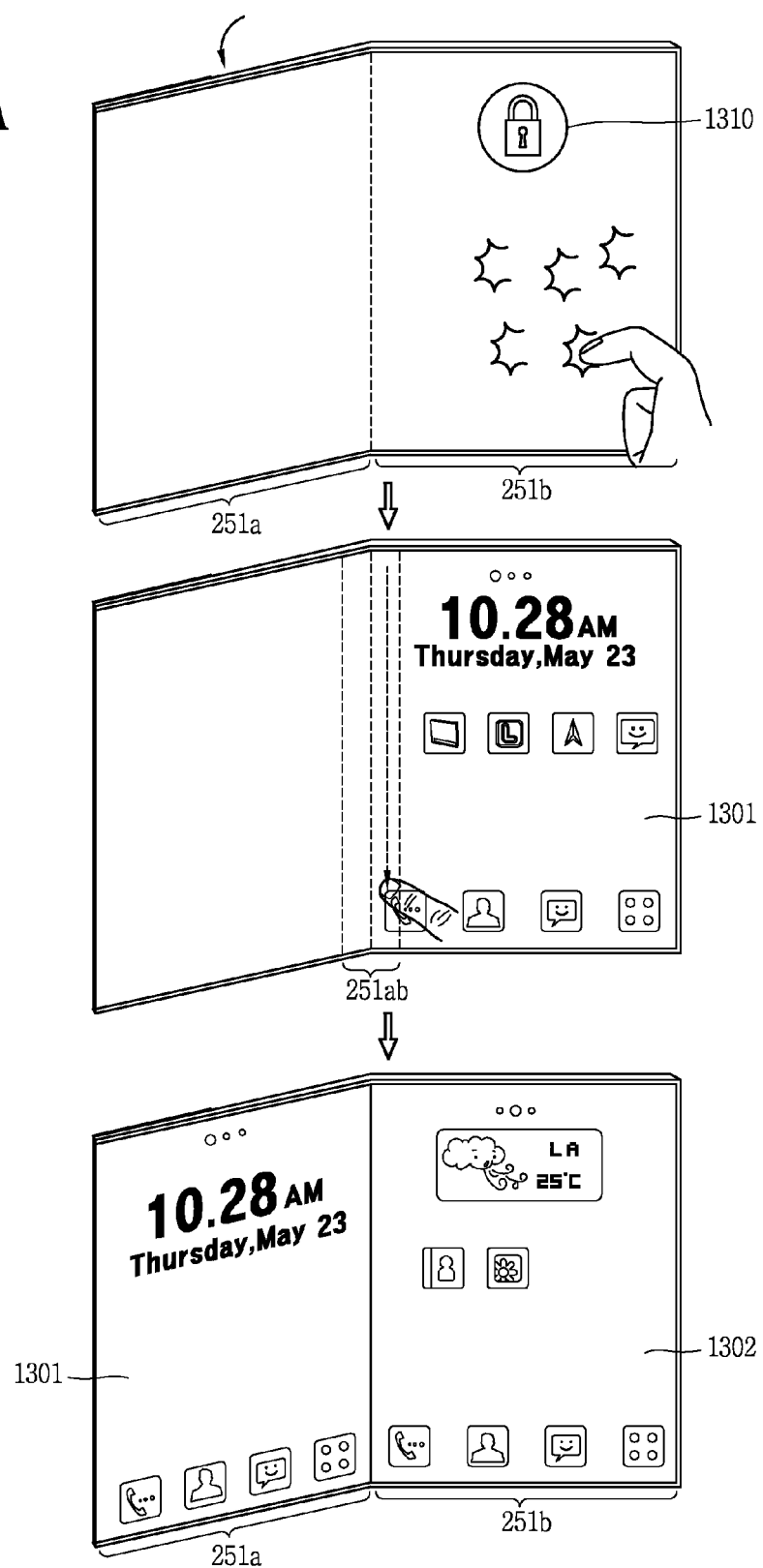
FIGS. 13A and 13B are exemplary views illustrating a method to control a screen using a touch input applied to a specific region in a locked state of a mobile terminal according to the present invention.
Figure 13B:
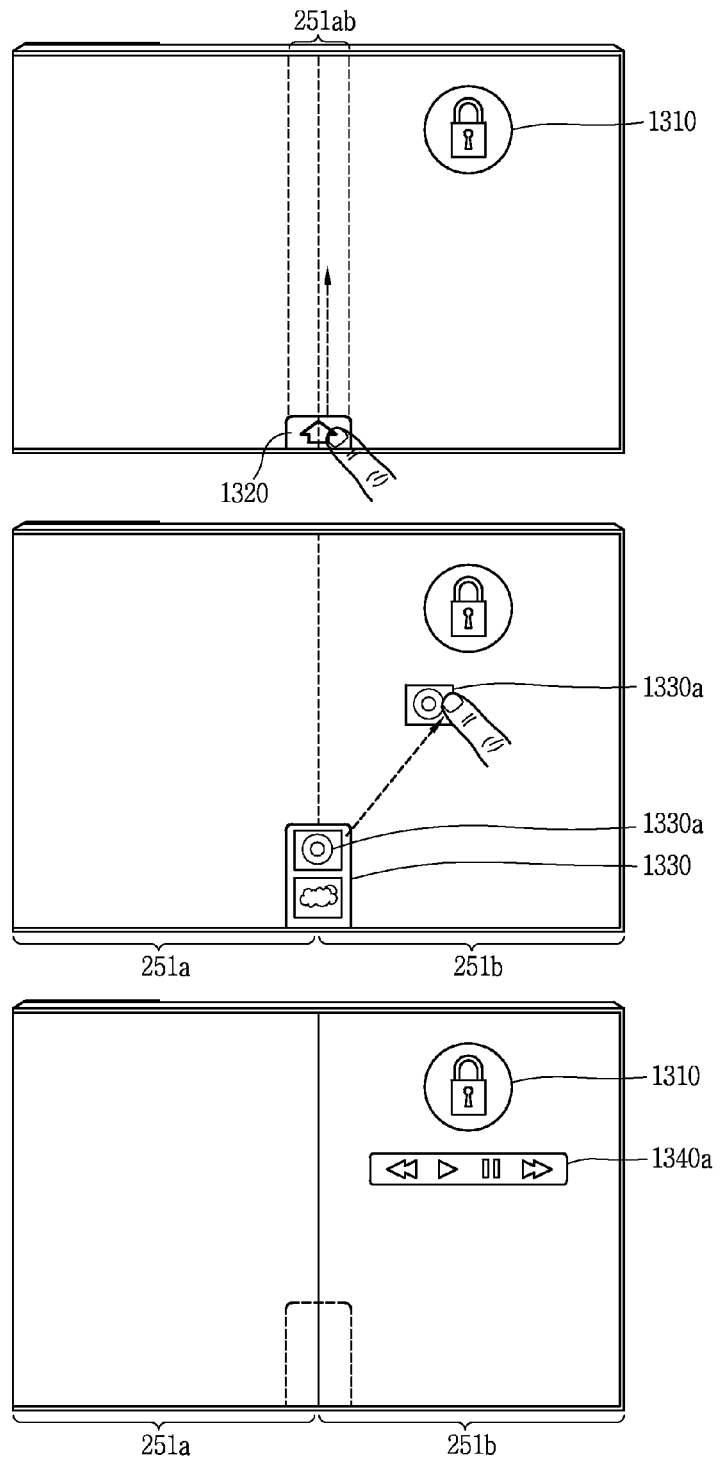

As described above, according to the present invention, it is possible to provide user convenience in that various control commands for changing an operation state or a screen display state of the mobile terminal may be performed through a new input method using a touch input to a specific region and a folding or unfolding motion of the mobile terminal, FIGS. 13A and 13B are exemplary views illustrating a method to control a screen using a touch input applied to a specific region in a state that a mobile terminal is locked according to the present invention.

In the present invention, in the open configuration, when a plurality of touch inputs applied to display regions disposed within an inner surface of the mobile terminal are matched with a preset pattern, a locked state of the mobile terminal is converted into a released state.

Specifically, the controller 180 converts a first region 251*a* into an activated state and a released state when a plurality of touch inputs are applied to the first region 251*a*, whereas it converts the second region 251*b* into an activated state and a released state when a plurality of touch inputs are executed at the second region 251*b*. Meanwhile, in a case where a plurality of touch inputs are executed at an entire part of the first and second regions 251*a* and 251*b*, the controller 180 converts the first and second regions 251*a* and 251*b* into an activated state and a released state. In this case, there may be a concern about an exposure to others when executing a plurality of touch inputs to release a locked state of the mobile terminal in a state that the mobile terminal is entirely open.

Thus, in the present invention, it is possible to release a locked state of the mobile terminal with respect to the first and second regions 251*a* and 251*b*, though a plurality of touch inputs are applied to one of the first and second regions 251*a* and 251*b* in a folded state of the mobile terminal.

Referring to FIG. 13A, when a first region 251*a* is rotated based on the specific region 251*ab*, it is possible to apply a plurality of touch inputs for releasing a locked state of the mobile terminal to the second region 251*b* without exposing information to others. In this case, a lock image (1310) informing a locked state of the mobile terminal may be displayed on the second region 251*b*.

When a plurality of touch inputs applied to the second region 251*b* are matched with a preset pattern, the controller 180 may release a locked state of the second region 251*b*, as shown in FIG. 13A, and display, for instance, a home screen page (1301) on the second region 251*b*.

Under the state, when a drag input performed from one end (for instance, an upper end) to another end (for instance, a lower end) of the specific region 251*ab* is applied, the controller 180 converts the first region 251*a* which is in an off-state into an activated state, and releases a locked state of the first region 251*a*. Thus, as shown in FIG. 13A, the home screen page (1301) which is output to the second region 251*b* is displayed on the first region 251*a*, and the home screen page (1301) may be turned over to a next page (1302).

Meanwhile, in the present invention, as described above with reference to FIG. 12C, an icon and a widget of an application may be disposed on the locked screen using a touch input to a specific region 251*ab* even in a locked state of the mobile terminal. FIG. 13B shows such examples.

Referring to FIG. 13B, in the open configuration, the controller 180 may output a lock image (1310) informing a locked state of the mobile terminal to at least one of the first region 251*a* and the second region 251*b*.

In this case, when a touch is applied to one end (for instance, a lower end) of the specific region 251*ab*, or the first and/or second region 251*a* and/or 251*b* is folded forward at a predetermined angle based on the specific region 251*ab*, the controller 180 may output an image object (1320) for displaying a predetermined menu on the specific region 251*ab*, as shown in FIG. 13B. The image object (1320) may include information (for instance, a dragged direction) related to an input type of a control command for displaying the predetermined menu, and disappear when the mobile terminal is unfolded flat or a predetermined time elapses.

When a drag input is executed in a direction pointed by the image object (1320), the controller 180 displays an icon list (1330) including an icon of an application and a widget icon which may be disposed in the first and/or second regions 251*a* and/or 251*b* being in a locked state on the specific region 251*ab* along a route of the drag input. In this case, the controller 180 may determine an order of outputting the icon of an application and a widget icon included in the icon list (1330) in line with the preset order of priority (for instance, a recently installed order).

Next, as shown in FIG. 13B, when a widget icon (1330*a*) desired to be selected from the icon list (1330) for arrangement is dragged to the second region 251*b*, the controller 180 disposes the selected widget icon (1330*a*) at a spot where the drag is released. In this case, the widget icon (1330*a*) disposed at the second region 251*b* may be changed into another image (1340*a*).

Meanwhile, the displayed icon list (1330) disappears from the specific region 251*ab* when a predetermined time elapses, or a preset touch (for instance, a drag input or a swipe input performed from an upper portion to a lower portion) is applied to the specific region 251*ab*.

According to the embodiment as described above, it is possible to dispose an icon and a widget on a locked screen using a touch input to a specific region, thereby capable of quickly accessing to a specific application or widget without releasing a locked state of the mobile terminal.

Figure 14A:
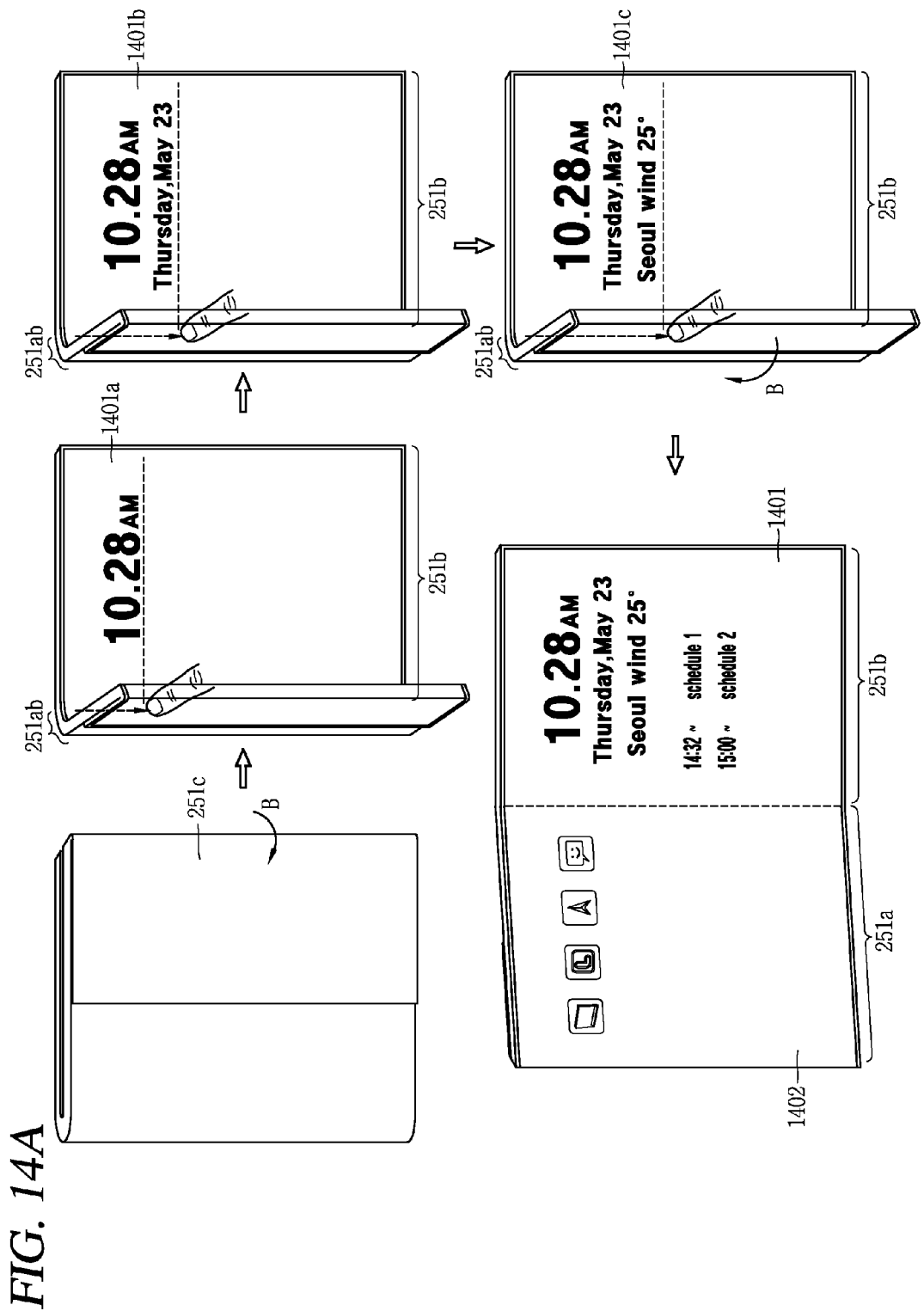
FIGS. 14A and 14B are exemplary views illustrating a method to control information displayed on an inner surface using a touch input applied to a specific region, in a case where a mobile terminal is converted from an open state into a closed state according to the present invention.
Figure 14B:
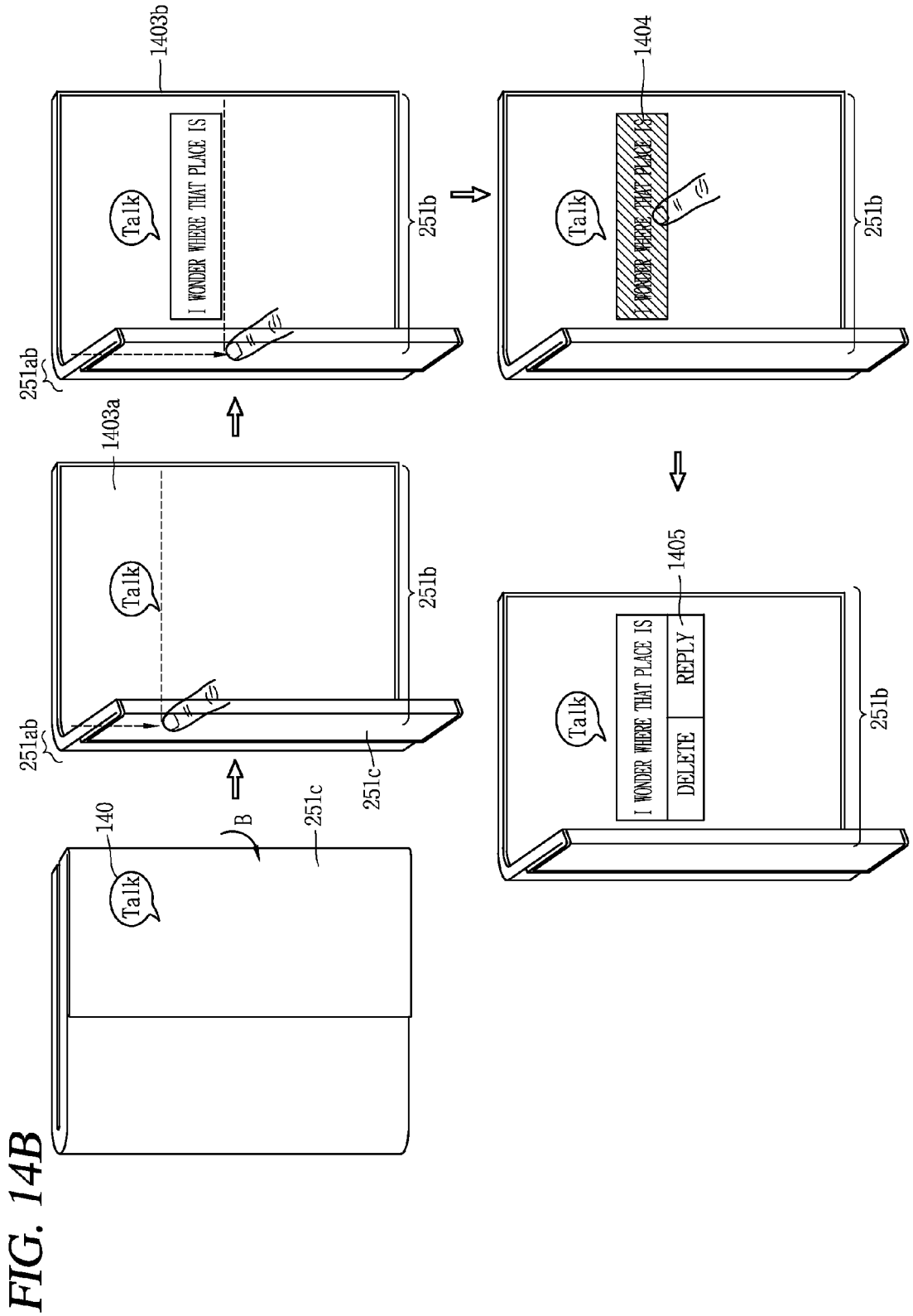

FIGS. 14A and 14B are exemplary views illustrating a method to control information displayed on an inner surface using a touch input applied to a specific region in a case where the mobile terminal is converted from an open (unfolded) state into a closed (folded) state, according to the present invention.

In the present invention, in the closed configuration, when an angle between the first region 251*a* and the second region 251*b* is enlarged based on the specific region 251*ab* within a reference range (for instance, 0°~90°) little by little, the controller 180 may control the display regions 251*a* and 251*b* which are disposed within an inner surface of the mobile terminal to be maintained in an off-state.

Under the state, when a touch applied to one end (for instance, an upper end) of the specific region 251*ab* is dragged in one direction (for instance, a lower direction), the controller 180 may control the amount of information that is output to the inner display regions 251*a* and 251*b* in proportion to a dragged degree.

Referring to FIG. 14A, when a touch started from an upper end of the specific region 251*ab* is dragged in a lower direction, an amount of information displayed on the second region 251*b* exposed to the front is gradually increased in proportion to the dragged degree. For instance, time information (1401*a*), date information (1401*b*), and weather information (1401*c*) are displayed in order along a direction that a touch applied to the specific region 251*ab* is dragged on the second region 251*b*.

Next, when the first and second regions 251*a* and 251*b* are completely unfolded so that the mobile terminal is in the open configuration, as shown in FIG. 14A, remaining information which has not been displayed together with the time information (1401*a*), date information (1401*b*) and weather information (1401*c*), is output to the first and second regions 251*a* and 251*b* (1401 and 1402).

FIG. 14B shows a method to control event information displayed on an inner surface using a touch input applied to a specific region, when an event is generated.

As shown in FIG. 14B, when an event is generated in a state that the mobile terminal is folded, a notification icon 1410 indicating generation of an event is displayed on the display region 251*c* disposed on an outer surface of the mobile terminal.

Under the state, as shown in FIG. 14B, when an angle between the first region 251*a* and the second region 251*b* is enlarged based on the specific region 251*ab* within a reference range (for instance, 0°~90°) little by little, the controller 180 may control the display regions 251*a* and 251*b* which are disposed within an inner surface of the mobile terminal to be maintained in an off-state. And when a touch applied to one end (for instance, an upper end) of the specific region 251*ab* is dragged in one direction (for instance, a lower direction), the controller 180 may control an amount of event information which is output to the inner display regions 251*a* and 251*b* in proportion to a dragged degree.

For instance, as shown in FIG. 14B, the controller 180 may display an icon (1403*a*) of an application corresponding to the event and a received message (1402*b*) which is content of the event on the second region 251*b* in order along a direction that a touch applied to the specific region 251*ab* is dragged (for instance, a lower direction).

In this case, as shown in FIG. 14B, when the mobile terminal is maintained in a folded state and a preset touch (for instance, a long touch input) is applied to the received message (1404), the controller 180 may enter an editing mode with respect to the received message (1404). Thus, as shown in FIG. 14B, a menu (1405) for selecting a 'delete', or 'reply' to the received message (1404) is displayed near the received message (1404). Meanwhile, when the first and second regions 251*a* and 251*b* are completely unfolded, an execution screen of an application corresponding to the event, for instance, a message chat window is displayed on the second region 251*b* which is viewed by a user.

Figure 14C:
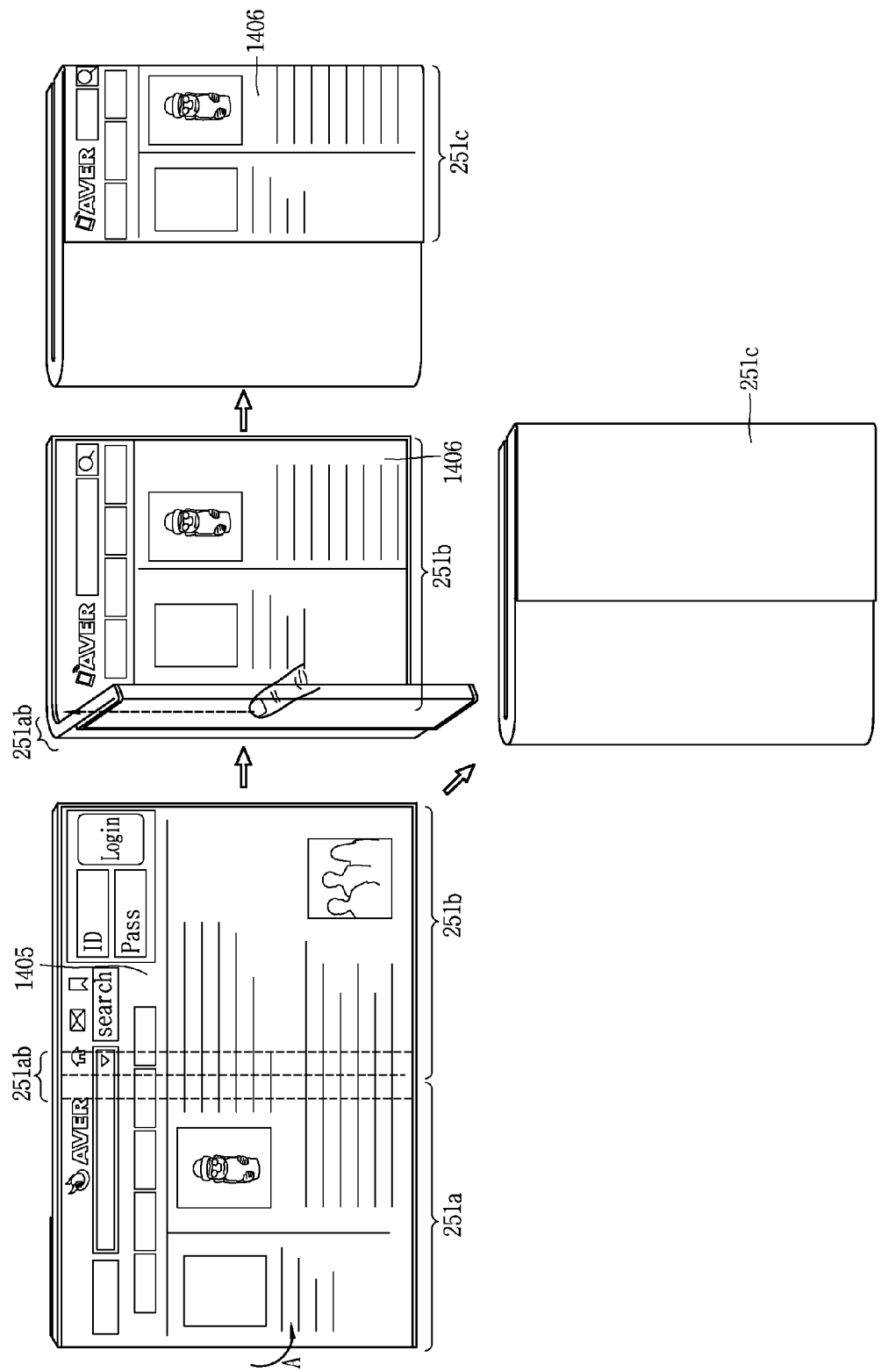
FIG. 14C is an exemplary view illustrating a method to control information displayed on an outer surface using a touch input applied to a specific region, before a mobile terminal is converted from an open state into a closed state according to the present invention.

FIG. 14C is an exemplary view illustrating a method to execute a consecutive screen viewing using a touch input applied to a specific region in a case where the mobile terminal is converted from one of an 'open configuration' or a 'closed configuration' into another according to the present invention.

The controller 180 may sense that a preset touch input (for instance, a swipe input, a drag input, and the like) is applied to the specific region 251*ab* before or after one of the open configuration and the closed configuration is converted into another.

For instance, as shown in FIG. 14C, in the open configuration, when a swipe input performed from an upper side to a lower side is applied to the specific region 251*ab*, as shown in FIG. 14C, in a state where an execution screen of the mobile terminal, for instance, an execution screen (1405) of a web application is output to the first and second regions 251*a* and 251*b*, the controller 180 may consecutively display the execution screen (1405), which has been displayed on the first and second regions 251*a* and 251*b*, on the display region 251*c* which is disposed on an outer surface of the mobile terminal. For instance, when a swipe input is applied to the specific region 251*ab* during reproducing a video and the mobile terminal is converted into a closed configuration, the video is immediately reproduced consecutively on the display region 251*c* disposed at an outer surface without being stopped.

According to this, when a task which has not been completed remains in the execution screen (1405) displayed on the first and second regions 251*a* and 251*b*, the remaining task is performed in the outer display region 251*c*. Meanwhile, when the mobile terminal is converted from the open configuration into the closed configuration without executing a touch input to the specific region 251*ab*, as shown in FIG. 14 C, no information may be output to the outer display region 251*c*.

Meanwhile, though not shown, a swipe input performed from an upper side toward a lower side is applied to the specific region 251*ab* after the mobile terminal is converted into the open configuration in a state that predetermined screen information is being output to the outer display region 251*c*, the controller 180 may consecutively display screen information which has been output to the display region 251*c* disposed on an outer surface, on the display regions 251*a* and 251*b* disposed on an inner surface. On the contrary, when the mobile terminal is converted into an open configuration without having a swipe input applied to the specific region 251*ab*, screen information different from the screen information which has been output in the closed state of the mobile terminal, may be displayed on the display regions 251*a* and 251*b* which are disposed on the inner surface of the mobile terminal.

According to the embodiment of the present invention as described above, it is possible to view consecutively screen information which has been output before conversion of the state or execute a task consecutively though the mobile terminal is converted from one of the open configuration or the closed configuration into another.

Figure 15:
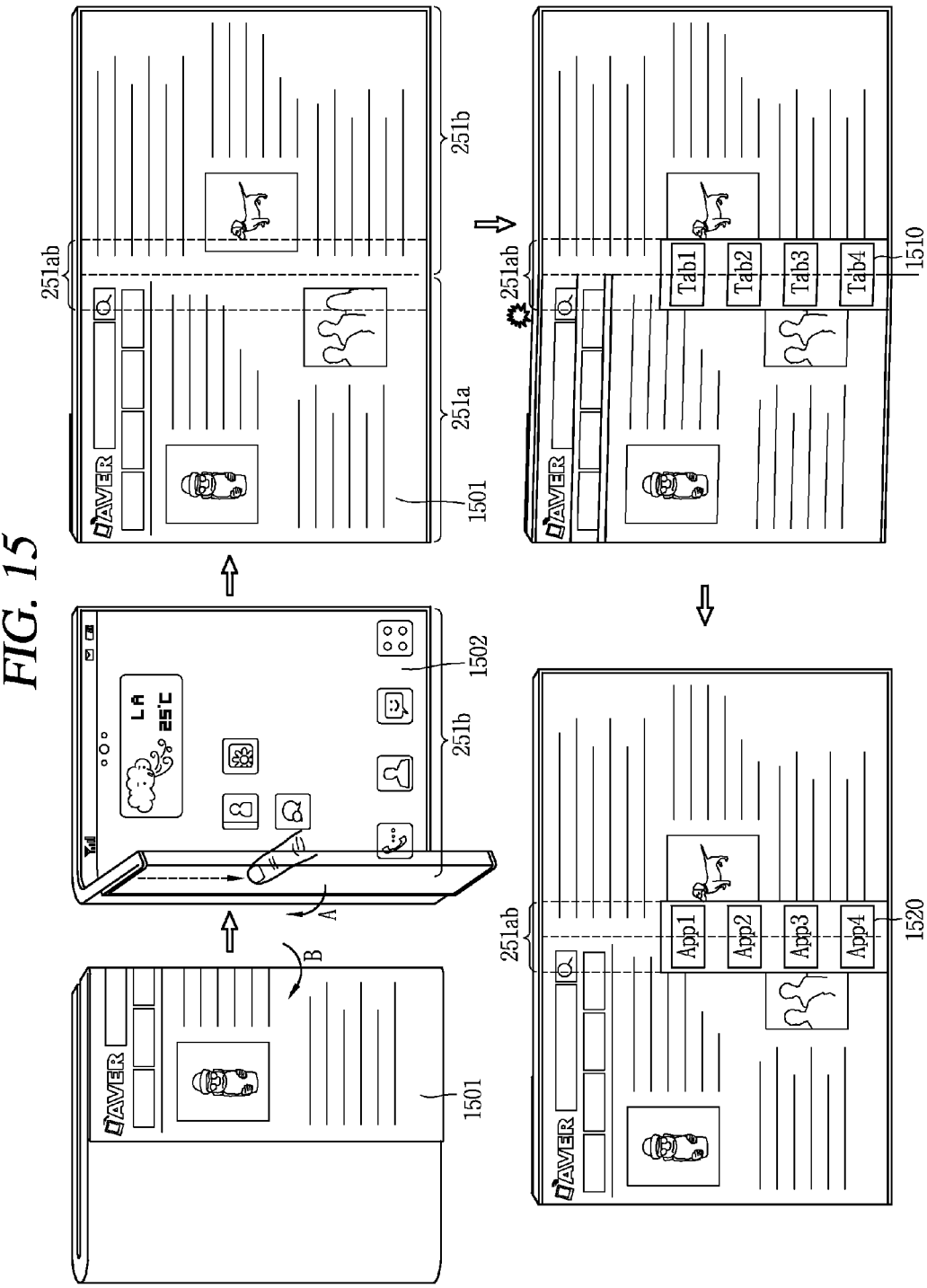
FIG. 15 is an exemplary view illustrating a method to change a first icon list displayed on a specific region of a mobile terminal to a second icon list according to the present invention.

FIG. 15 is an exemplary view illustrating a method to change a first icon list displayed on a specific region to a second icon list in the mobile terminal according to the present invention.

As shown in FIG. 15 when the mobile terminal is converted from the open configuration into the closed configuration, screen information (1501) displayed on the outer display region 251*c* may be viewed consecutively on the inner display regions 251*a* and 251*b* by applying a swipe input or a drag input performed in one direction to the specific region 251*ab*.

Like this, when a preset touch input is applied to the specific region 251*ab*, the controller 180 may control the home screen page (1502) output to the inner display regions 251*a* and 251*b* of the mobile terminal to be converted into an execution screen (1501) of a web application output to the outer display region 251*c*.

In this case, when the first and/or second region 251*a* and/or 251*b* is relatively rotated so as to be folded forward at a predetermined angle, or a preset touch input is applied to the specific region 251*ab*, the controller 180 may display or popup a first icon list (1510) related to the preset application on the specific region 251*ab*, as shown in FIG. 15.

Here, the first icon list (1510) may include menus related to screen information which is displayed on the first and second regions 251*a* and 251*b*. For instance, the first icon list (1510) may include tap icons of other web pages which are executed in the first and second regions 251*a* and 251*b*. The controller 180 may add a tap displayed on the first icon list (1510) to the current screen, remove the tap, or convert a screen into another screen, based on the touch input applied to the tap icon.

When the first and second regions 251*a* and 251*b* are bent backward at a predetermined angle so as to be in a 'bent state' based on the specific region 251*ab* without selecting a specific icon, and then converted into the 'open configuration', in a state that the first icon list (1510) is output, the controller 180 may convert the first icon list (1510) displayed on the specific region 151*ab* into a second icon list (1520) which is different from the first icon list (1510), as shown in FIG. 15. Here, the second icon list (1520) may include, for instance, an icon of a recently executed application or an icon corresponding to an application which is frequently used by a user.

As described above in detail, according to the mobile terminal and a method for controlling the same in accordance with the present invention, it is possible to easily convert a screen output to a display unit using an operation of folding or unfolding a display unit, and to input personal information without exposing to others by providing other information coincident with purpose of use according to a folded degree of a display unit.

Further, since it is possible to input various control commands such as a change of an operation state of a terminal while maintaining a current display state using an operation of folding or unfolding a display, a user's convenience can be enhanced.

As described above, the present invention is capable of implementing a computer readable code in a media in which programs are recorded. The computer readable media include all kinds of recording devices in which data readable by a computer system are stored. Examples of the computer readable media are a Hard Disk Drive (HDD), a Solid State Disk (SSD), a Silicon Disk Drive (SSD), a ROM, a RAM, a CD-ROM, a magnetic tape, a floppy disk, an optical data storage device, and include a type in the form of a carrier wave (for instance, transmission via internet). Further, the controller 180 of the computer terminal may be included.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless Alternatively specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising: a terminal body comprising an inner side and an outer side and configured to be converted between an open configuration and a folded configuration; a display comprising an inner display region disposed on the inner side and configured to be bent about a specific region; a hinge unit corresponding to the specific region, the hinge unit comprising an elastic member and a protrusion configured to limit a folding range of the terminal body in a backwards direction, wherein the elastic member is configured to bias the terminal body to the open configuration; a sensor configured to sense whether the display is folded in the backwards direction via hinge unit or the display is folded in a forward direction via the hinge unit; and a hardware controller configured to: cause the display to display on the inner display region first screen information and second screen information in a first screen mode region when the terminal body is in the open configuration, wherein the first screen information corresponds to a first application; in response to a backward bending event of the terminal body about the specific region, cause the display to display on the inner display region the first screen information in a second screen mode without displaying the second screen information; in response to the terminal body being biased to the open configuration by the elastic member following the backward bending event of the terminal body, cause the display to maintain display of the first screen information in the second screen mode without displaying the second screen information; in response to a forward bending event of the terminal body about the specific region, divide the inner region into a first region and a second region based on the specific region; cause the display to display a part of the first screen information on a part of the first display region according to a forward-folded degree of the specific region; and cause the second region to be converted into an inactive state wherein a part of the first region is covered by a bent portion of the terminal body corresponding to the second region, wherein when the first region and the second region are in a locked state, the controller is further configured to: cause the second region to release the locked state in response to a plurality of touch inputs applied to the second region which match a preset pattern; and cause the first region to release the locked state in response to a drag input received from one end to another end of the specific region.

2. The mobile terminal of claim 1, wherein:
the specific region defines a division between the first region and the second region of the inner display region; and
the angle of the forward bending event corresponds to a rotational degree between a surface corresponding to the first region and surface corresponding to the second region.

3. The mobile terminal of claim 2, wherein:
the controller is further configured to cause the display to display second screen information related to the first screen information according to the forward bending event;
the first screen information corresponds to an execution screen displayed on an entire part of the inner display region; and
the second screen information comprises a plurality of execution screens displayed on the first region and the second region.

4. The mobile terminal of claim 2, wherein:
the controller is further configured to terminate the display of the first screen information or the second screen information and cause the display to display third screen information when an angle of the forward bending event is less than a threshold value; and
the third screen information comprises an execution screen displayed on a third region of the inner display region.

5. The mobile terminal of claim 4, wherein:
the third screen information comprises an input area for inputting security-related information corresponding to the part of the first screen information, and
the controller is further configured to:
terminate the displaying of the third screen information and cause the display to display second screen information updated with the security-related information when the terminal body is moved to the open configuration; and
cause the display to display an indicator on an outer display region of the display that the security-related information has been applied to the second screen information.

6. The mobile terminal of claim 1, wherein the controller is further configured to cause the display to display the part of the first screen information when:
an angle of the forward bending event is maintained for a threshold length of time; or
a touch input applied to the first display region is maintained for another threshold length of time.

7. The mobile terminal of claim 1, wherein the controller is further configured to cause the display to display a first image object on the specific region in response to the forward bending event, the first image object related to display settings.

8. The mobile terminal of claim 7, wherein the controller is further configured to:
cause the display to display a plurality of icons in response to a touch drag input to the displayed first image object, the plurality of icons displayed along a path of the touch drag input on the specific region; and
apply a setting of the display setting based on a touch input to one of the plurality of icons.

9. The mobile terminal of claim 8, wherein the controller is further configured to cause the display to:
cease displaying the first image object after a threshold length of time; and
re-display the first image object in response to a touch input to the specific region while an angle of the forward bending event is maintained.

10. The mobile terminal of claim 7, wherein the controller is further configured to cause the display to display a second image object on the specific region related to at least a second application in response to a touch input to the specific region.

11. The mobile terminal of claim 10, wherein the controller is further configured to:
cause the display to display a plurality of application icons in response to a touch drag input to the displayed second image object, the plurality of application icons displayed along a path of the touch drag input on the specific region; and
execute an application corresponding to a selected one of the plurality of application icons;
terminate the displaying of the first screen information or the second screen information and cause the display to display an execution screen of the executed application.

12. The mobile terminal of claim 1, wherein:
the specific region defines a division between the first region and the second region of the inner display region; and
the controller is further configured to:
cause the display to display a plurality of settings icons in response to a touch drag input to the specific region, the plurality of settings icons displayed along a path of the touch drag input; and
apply a setting in response to a touch input to one of the plurality of settings icons;
wherein the setting is changed based on a forward bending angle between a surface corresponding to the first region and a surface corresponding to the second region.

13. The mobile terminal of claim 1, wherein:
the specific region defines a division between the first region and the second region of the inner display region; and
the controller is further configured to:
cause the display to display a plurality of application icons in response to a first touch drag input to the specific region, the plurality of application icons displayed along a path of the first touch drag input; and
move a selected one of the plurality of application icons to the first region or the second region in response to a second touch drag input moving the selected one of the plurality of applications to the corresponding first region or second region.

14. The mobile terminal of claim 1, wherein the controller is further configured to:
cause the display to display a first plurality of icons on the specific region in response to a touch input to the specific region; and
terminate the displaying of the first plurality of icons and cause the display to display a second plurality of icons in response to the terminal body being forwardly bent about the specific region at a predetermined angle.

15. The mobile terminal of claim 1, wherein:
the specific region defines a division between the first region and the second region of the inner display region;
the display further comprises an outer display region disposed on the outer side, the outer display region continuous with the inner display region; and
the controller is further configured to cause the display to display:
a notification of an event generated by an executed application on the outer display region while the terminal body is in the folded configuration; and
application information related to the event on the first region or the second region in response to opening the terminal body from the folded configuration;
wherein the application information is displayed based on an opening amount of the terminal body.

16. The mobile terminal of claim 15, wherein the controller is further configured to cause the display to display:
an execution screen of the executed application on one of the first region or second region; and
corresponding first screen information or second screen information on the other of the first region or second region.

17. The mobile terminal of claim 1, wherein:
the specific region defines a division between a first region and a second region of the inner display region;
the controller is further configured to cause the display to display:
a notification of an event on the first region while the terminal body is in the open configuration;
at least one icon in response to a touch drag input to the specific region, the at least one icon displayed along a path of the touch drag input and related to the event; and
an execution screen of an application corresponding to the at least one icon on the first region or the second region in response to a another touch drag input dragging the at least one icon to the corresponding first region or second region.

18. The mobile terminal of claim 1, wherein the controller is further configured to terminate the displaying of the first screen information or the second screen information and cause the display to display an execution screen of a preset application in response to the terminal body being forwardly bent about the specific region.

19. The mobile terminal of claim 1, wherein:
the display further comprises an outer display region disposed on the outer side, the outer display region continuous with the inner display region; and
the controller is further configured to cause the display to display:
information previously displayed on the inner display region on the outer display region when a touch input is received at the specific region and the terminal body is converted from the open configuration to the folded configuration; and
information previously displayed on the outer display region on the inner display region when the terminal body is converted from the folded configuration to the open configuration and a touch input is received at the specific region.

20. A method for controlling a mobile terminal comprising a terminal body, a hinge unit comprising an elastic member and a protrusion configured to limit a folding range of the terminal body in a backwards direction, and a sensor, wherein the terminal body comprises an inner side and an outer side and is configured to be converted between an open configuration and a folded configuration, the method comprising: displaying on an inner display region first screen information and second screen information in a first screen mode when the terminal body is in the open configuration, wherein the first screen information corresponds to a first application; in response to a backward bending event of the terminal body about the specific region, display on the inner display region the first screen information in a second screen mode without displaying the second screen information; in response to the terminal body being biased to the open configuration by the elastic member following the backward bending event of the terminal body, maintain display of the first screen information in the second screen mode without displaying the second screen information; in response to a forward bending event of the terminal body about a specific region of the display, dividing the inner display region into a first region and a second region based on the specific region; displaying a part of the first screen information on a part of the first display region according to a forward-folded degree of the specific region; and converting the second region into an inactive state wherein a part of the first region is covered by a bent portion of the terminal body corresponding to the second region, wherein when the first region and the second region are in a locked state, the controller is further configured to: release the locked state in response to a plurality of touch inputs applied to the second region which match a preset pattern; and release the locked state in response to a drag input received from one end to another end of the specific region.

* * * * *